(12) United States Patent
Peretz

(10) Patent No.: US 10,965,156 B2
(45) Date of Patent: Mar. 30, 2021

(54) CAPACITIVE WIRELESS POWER TRANSFER BY MEANS OF ADAPTIVE MATCHING NETWORKS

(71) Applicant: B. G. Negev Technologies and Applications Ltd., At Ben-Gurion University, Beer Sheva (IL)

(72) Inventor: Mor Mordechai Peretz, Lehavim (IL)

(73) Assignee: B. G. Negev Technologies and Applications Ltd., At Ben-Gurion University, Beer Sheva (IL)

( * ) Notice: Subject to any disclaimer, the term of this patent is extended or adjusted under 35 U.S.C. 154(b) by 0 days.

(21) Appl. No.: 16/651,225

(22) PCT Filed: Nov. 6, 2018

(86) PCT No.: PCT/IL2018/051183
§ 371 (c)(1),
(2) Date: Mar. 26, 2020

(87) PCT Pub. No.: WO2019/092701
PCT Pub. Date: May 16, 2019

(65) Prior Publication Data
US 2020/0287413 A1 Sep. 10, 2020

Related U.S. Application Data

(60) Provisional application No. 62/582,328, filed on Nov. 7, 2017.

(51) Int. Cl.
*H02J 50/05* (2016.01)
*H02J 50/90* (2016.01)
*H02M 3/335* (2006.01)

(52) U.S. Cl.
CPC .............. *H02J 50/05* (2016.02); *H02J 50/90* (2016.02); *H02M 3/33569* (2013.01)

(58) Field of Classification Search
CPC ....... H02J 50/05; H02J 50/90; H02M 3/33569
(Continued)

(56) References Cited

U.S. PATENT DOCUMENTS 10,298,058 B2 * 5/2019 Afridi ..................... H02J 50/05
2014/0253052 A1 9/2014 Goma et al.
(Continued)

FOREIGN PATENT DOCUMENTS

KR 10-2013-0113240 A 10/2013
WO 2016/179329 A1 11/2016

OTHER PUBLICATIONS

Steigerwald, R. L., "A Comparison of Half-Bridge Resonant Converter Topologies," IEEE Transactions on Power Electronics, vol. 3, No. 2, Apr. 1988, pp. 174-182.
(Continued)

*Primary Examiner* — Metasebia T Retebo
(74) *Attorney, Agent, or Firm* — Seed IP Law Group LLP

(57) ABSTRACT

A controlled wireless Capacitive Power Transfer (CPT) system includes a primary side for wirelessly transmitting power to a secondary side via coupling plates having mutual capacitance $C_M$. A primary adaptive matching network regulates the current flowing to the secondary side. A primary controller includes a first control loop for adjusting the switching frequency $f_{sw}$ to compensate for changes in the impedance of the primary matching network. A second control loop adjusts the resonant frequency of the primary resonant circuit to track the switching frequency $f_{sw}$. A secondary adaptive matching network is comprised of a secondary resonant circuit with a bias-controlled variable secondary inductor serially connected to the mutual capacitance $C_M$ and a capacitor parallelly connected to the mutual capacitance $C_M$, for matching the impedance of the secondary matching network. A secondary controller adjusts the
(Continued)

impedance of the secondary matching network to match the resonant frequency of the primary resonant circuit.

20 Claims, 19 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2015/0326033 A1* | 11/2015 | Ichikawa | H02J 7/025 307/104 |
| 2016/0294217 A1 | 10/2016 | Mi et al. | |
| 2017/0005532 A1 | 1/2017 | Akuzawa et al. | |

OTHER PUBLICATIONS

Sanders, S.R., "On Limit Cycles and Describing Function Method in Periodically Switched Circuits," IEEE Transactions on Circuits Systems, vol. 40, No. 9, Sep. 1993, pp. 564-572.

Hayes, J. G. et al., "Rectifier-Compensated Fundamental Mode Approximation Analysis of the Series Parallel LCLC Family of Resonant Converters with Capacitive Output Filter and Voltage-Source load," Proc. of the IEEE PESC, 1999, pp. 1030-1036.

Forghani-zadeh, H. P. et al., "Current-Sensing Techniques for DC-DC Converters," Proc. IEEE Midwest Sympo., Circ. and Systs., vol. 2, 2002, pp. 577-580.

Ben-Yaakov, S. et al., "Simulation Bits: A SPICE Behavioral Model of Non-Linear Inductors," IEEE Power Electronics Society Newsletter, Fourth Quarter 2003, pp. 9-10.

Xiao, C. et al., "An Overview of Integratable Current Sensor Technologies," Proc. Conf. Rec. Ind. Appl., vol. 2, 2003 IEEE, pp. 1251-1258.

IEEE-SA Standards Board, "IEEE Standard for Safety Levels with Respect to Human Exposure to Radio Frequency Electromagnetic Fields, 3kHz to 300 GHz", IEEE Standard C95.1, Oct. 2005, pp. iv-238.

Ben-Yaakov, S. et al., "A Self-Adjusting Sinusoidal Power Source Suitable for Driving Capacitive Loads," IEEE Transactions on Power Electronics, vol. 21, No. 4, Jul. 2006, pp. 890-898.

Altera DE2 Board, "DE2 Development and Education Board User Manual", Altera Corporation, 2006, pp. 1-66.

Peng, H. et al., "Modeling of Quantization Effects in Digitally Controlled DC-DC Converters," IEEE Transactions on Power Electronics, vol. 22, No. 1, Jan. 2007, pp. 208-215.

Collins, L., "Cutting the Cord," Engineering & Technology, vol. 2, No. 6, Jun. 2007, pp. 30-33.

Si, P. et al., "A Frequency Control Method for Regulating Wireless Power to Implantable Devices," IEEE Transactions on Biomedical Circuits and Systems, vol. 2, No. 1, Mar. 2008, pp. 22-29.

Peretz, M. M. et al., "Digital Control of Resonant Converters: Enhancing Frequency Resolution by Dithering," Proc. IEEE Applied Power Electronics Conference and Exposition (APEC), Feb. 2009, pp. 1202-1207.

Xu, D. et al., "Ceiling-Based Visual Positioning for an Indoor Mobile Robot With Monocular Vision," IEEE Transactions on Industrial Electronics, vol. 56, No. 5, May 2009, pp. 1617-1628.

Peretz, M. M. et al., "Digital Control of Resonant Converters: Resolution Effects on Limit Cycles," IEEE Transactions on Power Electronics, vol. 25, No. 6, Jun. 2010, pp. 1652-1661.

Imura, T. et al., "Maximizing Air Gap and Efficiency of Magnetic Resonant Coupling for Wireless Power Transfer Using Equivalent Circuit and Neumann Formula," IEEE Transactions on Industrial Electronics, vol. 58, No. 10, Oct. 2011, pp. 4746-4752.

Kline, M. et al., "Capacitive Power Transfer for Contactless Charging," Proc. IEEE Applied Power Electronics Conference and Exposition, 2011, pp. 1398-1404.

Ahsanuzzaman, S. M. et al., "Low-Volume Buck Converter With Adaptive Inductor Core Biasing," Proc. IEEE Applied Power Electronics Exposition Conference and Exposition (APEC), 2012, pp. 335-339.

Kalita, K. et al., "Modelling and behavioral simulation of a high-speed phase-locked loop for frequency synthesis," IET Signal Processing, vol. 6, No. 3, 2012, pp. 195-204.

Theodoridis, M. P. "Effective Capacitive Power Transfer," IEEE Transactions on Power Electronics, vol. 27, No. 12, Dec. 2012, pp. 4906-4913.

Waters, B. H. et al., "Adaptive Impedance Matching for Magnetically Coupled Resonators," PIERS Proceedings, Moscow, Russia, Aug. 19-23, 2012, pp. 694-701.

Pinuela, M. et al., "Maximizing DC-to-Load Efficiency for Inductive Power Transfer," IEEE Transactions on Power Electronics, vol. 28, No. 5, May 2013, pp. 2437-2447.

Beh, T.C. et al., "Automated Impedance Matching System for Robust Wireless Power Transfer via Magnetic Resonance Coupling," IEEE Transactions on Industrial Electronics, vol. 60, No. 9, Sep. 2013, pp. 3689-3698.

Wu, K. et al., "Wireless Power Transmission, Technology, and Applications" Proceedings of the IEEE, vol. 101, No. 6, Jun. 2013, pp. 1271-1275.

Shin, J. et al., "Design and Implementation of Shaped Magnetic-Resonance-Based Wireless Power Transfer System for Roadway-Powered Moving Electric Vehicles," IEEE Transactions on Industrial Electronics, vol. 61, No. 3, Mar. 2014, pp. 1179-1192.

Lim, Y. et al., "An Adaptive Impedance-Matching Network Based on a Novel Capacitor Matrix for Wireless Power Transfer," IEEE Transactions on Power Electronics, vol. 29, No. 8, Aug. 2014, pp. 4403-4413.

Hui, S. Y. R. et al., "A Critical Review of Recent Progress in Mid-Range Wireless Power Transfer," IEEE Transactions on Power Electronics, vol. 29, No. 9, Sep. 2014, pp. 4500-4511.

Langlotz, T. et al., "Next Generation Augmented Reality Browsers: Rich, Seamless, and Adaptive," Proceedings of the IEEE, vol. 102, No. 2, Feb. 2014, pp. 155-169.

Musavi, F. et al., "Overview of wireless power transfer technologies for electric vehicle battery charging," IET Power Electronics, vol. 7, No. 1, 2014, pp. 60-66.

Lee, B. et al., "A Triple-Loop Inductive Power Transmission System for Biomedical Applications," IEEE Transactions on Biomedical Circuits Systems, vol. 10, No. 1, 2015, pp. 138-148.

Lu, F. et al., "A Double-Sided LCLC-Compensated Capacitive Power Transfer System for Electric Vehicle Charging," IEEE Transactions on Power Electronics, vol. 30, No. 11, Nov. 2015, pp. 6011-6014.

Li, H. et al., "A Maximum Efficiency Point Tracking Control Scheme for Wireless Power Transfer Systems Using Magnetic Resonant Coupling," IEEE Transactions on Power Electronics, vol. 30, No. 7, Jul. 2015, pp. 3998-4008.

Kim, J. et al., "Range-Adaptive Wireless Power Transfer Using Multiloop and Tunable Matching Techniques," IEEE Transactions on Industrial Electronics, vol. 62, No. 10, Oct. 2015, pp. 6233-6241.

Dai, J. et al., "A Survey of Wireless Power Transfer and a Critical Comparison of Inductive and Capacitive Coupling for Small Gap Applications," IEEE Transactions on Power Electronics, vol. 30, No. 11, Nov. 2015, pp. 6017-6029.

Ezra, O. et al., "Magneto-Electro-Mechanical Modeling of Magnetic Actuation Systems," Proc. IEEE Applied Power Electronics Conference and Exposition (APEC), 2015, pp. 2628-2634.

Li, S. et al., "Wireless Power Transfer for Electric Vehicle Applications," IEEE Journal of Emerging and Selected Topics in Power Electronics, vol. 3, No. 1, Mar. 2015, pp. 4-17.

Sinha, S. et al., "Design of Efficient Matching Networks for Capacitive Wireless Power Transfer Systems," Proc. of IEEE Wrkshp. Ctrl. and Model. for Power Electrons. (COMPEL), Trondheim, Norway, 2016, 7 pgs.

Sohn, Y. H. et al., "Gyrator-Based Analysis of Resonant Circuits in Inductive Power Transfer Systems," IEEE Transactions on Power Electronics, vol. 31, No. 10, Oct. 2016, pp. 6824-6843.

Zhang, H. et al., "A Four-Plate Compact Capacitive Coupler Design and LCL-Compensated Topology for Capacitive Power Transfer in

(56) References Cited

OTHER PUBLICATIONS

Electric Vehicle Charging Application," IEEE Transactions on Power Electronics, vol. 31, No. 12, Dec. 2016 pp. 8541-8551.

Zhang, H. et al., "A Loosely Coupled Capacitive Power Transfer System with LC Compensation Circuit Topology," Proc. IEEE Energy Conyers. Congr. Expo. (ECCE), 2016, pp. 1-5.

Yeo, T-D. et al., "Design of Maximum Efficiency Tracking Control Scheme for Closed-Loop Wireless Power Charging System Employing Series Resonant Tank," IEEE Transactions on Power Electronics, vol. 32, No. 1, Jan. 2017, pp. 471-478.

Lu, F. et al., "A Double-Sided $LC$-Compensation Circuit for Loosely Coupled Capacitive Power Transfer," IEEE Transactions on Power Electronics, vol. 33, No. 2, Feb. 2018, pp. 1633-1643.

Texas Instruments, "LMG5200 80-V, 10-A GaN Half-Bridge Power Stage", SNOSCYA4E—Mar. 2015—Revised Oct. 2018, available at http://www.ti.com/lit/ds/symlink/lmg5200.pdf, accessed Mar. 2017.

Lu, F. et al., "A Two-Plate Capacitive Wireless Power Transfer System for Electric Vehicle Charging Applications," IEEE Transactions on Power Electronics, vol. 33, No. 2, Feb. 2018, pp. 964-969.

Lu, K. et al., "Design of auto frequency tuning capacitive power transfer system based on class-$E^2$ dc/dc converter," IET Power Electronics, vol. 10, No. 12, 2017, pp. 1588-1595.

Kumar, A. et al., "Improved Design Optimization for High-Efficiency Matching Networks," IEEE Transactions on Power Electronics, vol. 33, No. 1, Jan. 2018, pp. 37-50.

Sinha, S. et al., "Improved Design Optimization of Efficient Matching Networks for Capacitive Wireless Power Transfer Systems," Proc. IEEE Applied Power Electronics Conference and Exposition (APEC), 2018, pp. 3167-3173.

Abramov, E. et al., "Low Voltage Sub-Nanosecond Pulsed Current Driver IC for High-Resolution LIDAR Applications," Proc. IEEE Applied Power Electronics Conference and Exposition (APEC), 2018, pp. 708-715.

Abramov, E. et al., "Fully-Integrated Digital Average Current-Mode Control Voltage Regulator Module IC," IEEE Journal of Emerging and Selected Topics in Power Electronics, vol. 6, No. 2, Jun. 2018, pp. 485-499.

Zhang, Z. et al., "Wireless Power Transfer—An Overview," IEEE Transactions on Industrial Electronics, vol. 66, No. 2, Feb. 2019, pp. 1044-1058.

Lu, Fei, Hua Zhang and Chris Mi "A review on the recent development of capacitive wireless power transfer technology", Energies 10(11),1752, Nov. 1, 2017.

International Search Report for Application No. PCT/IL2018/051183 dated Jan. 17, 2019, 5 pgs.

\* cited by examiner

CAPACITIVE WIRELESS POWER TRANSFER BY MEANS OF ADAPTIVE MATCHING NETWORKS

BACKGROUND

Technical Field

The present disclosure relates generally to the field of Wireless Power Transfer (WPT). More specifically, the disclosure relates to a system for efficiently and wirelessly performing Capacitive Power Transfer (CPT) using adaptive matching networks.

Description of the Related Art

Today, there is a growing demand for mobile power, which is essential to keep high-performance devices available for extended periods or even continuously. Wireless power transfer (WPT) technology potentially provides energy at all times, and reduces the dependency of weight-sensitive and volume-sensitive mobile and portable applications with bulky batteries as a reliable main source of energy.

One of the WPT solutions uses a capacitive power transfer (CPT) approach. CPT is an alternative near-field power transfer method to the well-known magnetic field-based approaches. One of the more attractive advantages of capacitive-based WPT is the avoidance of undesired eddy currents and electromagnetic interfaces (EMI) that are associated with magnetic-based WPT solutions. In addition to efficiency improvements, CPT systems are potentially of lower volume and their construction is simple.

A main challenge of general near-field WPT systems and of CPT in particular is that the power transfer capability and efficiency depend on the distance and alignment between the transmitting and receiving sides. In addition, the coupling coefficient of the transfer medium and load conditions are sensitive to changes in environmental conditions, component aging and temperature drifts, which dramatically decreases the power transfer capabilities of the system. Reducing the sensitivity of the WPT system to variations can be alleviated by designing matching networks that provide loose coupling between the transmitting and receiving sides. However, in this solution, the system characteristics still strongly depend of the component values and the precision of the switching (operating) frequency. To fully disengage the system's characteristics from any drifts, changes and variations, a closed-loop active compensation is essential.

Several methods to reduce the effects of components and medium variations of WPT systems have been proposed for general power transfer, which can also be adapted to CPT. These include: frequency tuning, compensation networks impedance matching, and post regulation DC-DC conversion. In a frequency tuning approach, the switching frequency is adjusted to track the resonant frequency, which results in optimal operating conditions. However, since the allowed frequency range for energy transfer is quite narrow, this solution alone does not accommodate wide variations.

In impedance matching methods, the resonant inductor and capacitor can be adjusted at a fixed frequency. Thus, the output voltage/current can be regulated by actively adjusting the matching network impedance. The latter provides flexibility for regulating the transferred power to the load, but requires additional control circuitry and potential degradation of the overall efficiency. Although existing closed-loop methods can overcome some system variations and can extend the power delivery range, a single control method is not sufficient to guarantee reliable operation of WPT systems.

Magnetic field based WPT and in particular magnetic resonance, combined with control methods has been proposed, however, a closed-form control mechanism for CPT has not been addressed.

The present disclosure provides a multi-loop controller for capacitive-based WPT systems that compensates for the variations of multiple cross-coupling interactions between the transmitting and receiving sides.

The present disclosure also provides an adaptive multi-loop controller for CPT technology, which compensates on the fly for variations of source and the load circuits, coupling interface (distance and/or alignment) and matching networks.

Other advantages of this disclosure will become apparent as the description proceeds.

BRIEF SUMMARY

A controlled wireless Capacitive Power Transfer (CPT) system, based on adaptive matching networks, comprises:

a) a primary power transmitter side for wirelessly transmitting power to a secondary power receiver side via coupling plates having mutual capacitance $C_M$, wherein the primary power transmitter side comprises:

a.1) a power source connected to a power driver operating a determined switching frequency $f_{sw}$;

a.2) a primary adaptive matching network comprised of a primary resonant circuit with a bias-controlled variable primary inductor serially connected to the mutual capacitance $C_M$ and a capacitor, parallelly connected to the mutual capacitance $C_M$, for regulating the current flowing to the secondary power receiver side via the mutual capacitance $C_M$; and a.3) a primary controller comprised of:

a.3.1) a first control loop, for adjusting the switching frequency $f_{sw}$ to compensate for changes in the impedance of the primary adaptive matching network, whenever the mutual capacitance $C_M$ changes;

a.3.1) a second control loop, for adjusting the resonant frequency of the primary resonant circuit to track the switching frequency $f_{sw}$, by providing appropriate bias to the primary inductor and changing the resonant frequency of the primary resonant circuit; and the secondary power receiver side comprising:

b.1) a rectifier circuit connected to a load and operating at resonant frequency of the primary resonant circuit;

b.2) a secondary adaptive matching network connecting between the mutual capacitance $C_M$ and the rectifier circuit and comprising a secondary resonant circuit with a bias-controlled variable secondary inductor serially connected to the mutual capacitance $C_M$ and a capacitor parallelly connected to the mutual capacitance $C_M$, for matching the impedance of the secondary adaptive matching network;

b.3) a secondary controller comprised of:

b.3.1) a control loop, for adjusting the impedance of the secondary adaptive matching network to match the resonant frequency of the primary resonant circuit by providing appropriate bias to the secondary inductor.

The first control loop may be implemented by a digital phase-locked loop (DPLL).

The switching frequency may be synthesized to continuously follow the resonant frequency of the primary power transmitter side, in response variations of the system parameters.

The power delivery from the primary power transmitter side to the secondary power receiver side is disengaged from cross-coupling interactions between the transmitting and receiving sides and variations of the electrical circuits and capacitive medium.

In one aspect, power delivery from the primary power transmitter side to the secondary power receiver side is adaptively tuned to satisfy required power conditions at either the coupling plates terminals or at the output terminals.

In one aspect, power delivery from the primary power transmitter side to the secondary power receiver side is adaptively tuned by adjusting the switching (operating) frequency and varying the value of one or more reactive components.

The primary and/or secondary adaptive matching network may include a bias controlled or a command controlled variable inductance or capacitance, which may be varied continuously, or in segments.

The power driver on the primary power transmitter side may be a full-bridge inverter.

The primary power transmitter side may be adapted to deliver constant current to the secondary power receiver side.

The resonant frequency of the primary and secondary resonant circuits may be adjusted by changing the values of the inductors or parallel capacitors or both.

In one aspect, the drive (i.e., the switching or operating) frequency tracks the resonant frequency on the fly, and the transmitted power is regulated by the resonant circuit characteristics.

The primary and/or secondary resonant circuit may comprise a plurality of inductors and capacitors in either series connection, parallel connection, or a combination of both connections.

The resonant circuit in each side may comprise two or more variable components, such as inductors or capacitors or a combination of both.

In one aspect, the bandwidth of the first control loop is the highest bandwidth, to obtain the fastest response, and the bandwidth of the control loop of the secondary power receiver side is lower than the bandwidth of the first control loop.

The bandwidth of the second control loop may be the lowest bandwidth.

The bias driver may be realized by either a linear regulator or by a buck converter.

The current of the bias driver of the variable primary and secondary inductors may be regulated by an internal closed-current-loop.

Optimal power transfer conditions may be obtained when the phase difference between the primary's and secondary's resonant frequencies equals 90°.

The control loops may be characterized by their bandwidth difference.

In one aspect, the transmitted signal at the primary power transmitter side output terminals is modulated, for transmitting power to a plurality of loads, each corresponding to a secondary power receiver side, such that each load will receive the transmitted power at a different frequency.

An optional fourth feedback loop may be employed to facilitate direct regulation of the output characteristics through back communication from the secondary power receiver side to the primary power transmitter side, wherein the optional fourth feedback loop adjusts the signal transmitted from the primary power transmitter side, until a desired transmitted signal is obtained.

In one aspect, the secondary power receiver side comprises an independent tuning circuit.

A method for controlling power transfer in a Capacitive Power Transfer (CPT) system as discussed above, comprised of a primary power transmitter side for wirelessly transmitting power to a secondary power receiver side via coupling plates having mutual capacitance $C_M$, and respective primary and secondary adaptive matching networks, comprises the steps of:

a) upon initiating the tuning of the primary and secondary adaptive matching networks, determining the switching frequency $f_{sw}$, and the variable primary and secondary inductors according to a default set of pre-loaded values;

b) tuning the switching frequency of the primary power driver of the first control loop;

c) detecting a phase difference between the signals $V_P$ and $V_{CP}$ and maintaining a 90° phase angle between $V_P$ and $V_{CP}$ at all times;

d) whenever the detected phase difference between the input signals $V_P$ and $V_{CP}$ is not 90°, generating an error signal to create a new switching frequency, until the switching frequency equals the resonant frequency of the primary resonant circuit;

e) detecting a phase difference between the input signals $V_S$ and $V_{CS}$ and maintaining the phase difference at 90°;

f) adjusting the secondary power receiver side's inductance value $L_S$ to tune the secondary adaptive matching network, according to the switching frequency $f_{sw}$, of the primary power transmitter side;

g) providing a correction signal to adjust the inductance value $L_S$, until the secondary adaptive matching network is at resonance (until $f_{sw}=f_0$) and the phase difference between the signals $V_S$ and $V_{CS}$ equals 90°;

sensing the regulated current $I_{reg}$ from the primary resonant circuit and comparing the regulated current to a target/reference current; and h) generating a correction signal that adjusts the inductance $L_P$ through bias winding until the desired regulated current is achieved.

DETAILED DESCRIPTION

The present disclosure proposes an adaptive multi-loop controller for capacitive wireless power transfer (WPT) systems which is based on adaptive matching networks, in which power is wirelessly transmitted from a primary power transmitter side to a secondary power receiver side (also referred to herein as a primary side and a secondary side). The multi-loop controller combines continuous frequency tracking and matching networks tuning on both the primary (power transmitter) side and the secondary (power receiver) side, to regulate a target current/power to the receiving side at best power transfer conditions. This allows effectively disengaging the power delivery capabilities from the cross-coupling interactions between the transmitting and receiving sides, variations of the electrical circuits and capacitive medium. The proposed controller disengages the power delivery capabilities from drifts or variations, which enables spatial freedom of the transferred energy to the receiving side. The proposed controller uses continuous tuning of the switching frequency to the resonant frequency, and adjusts both the transmitter's and receiver's matching networks such that the best power transfer conditions are obtained for any given combination of distance, displacement, misalignment or component values. The proposed controller uses tuned network realization that is based on a variable inductor (rather than relays or semiconductor switches), and therefore enables continuous self-tuned impedance matching. Alternatively, the tuned network realization may be based on variable capacitance or a combination of variable capacitance and variable inductance, to allow continuous self-tuned impedance matching.

Figure 1:
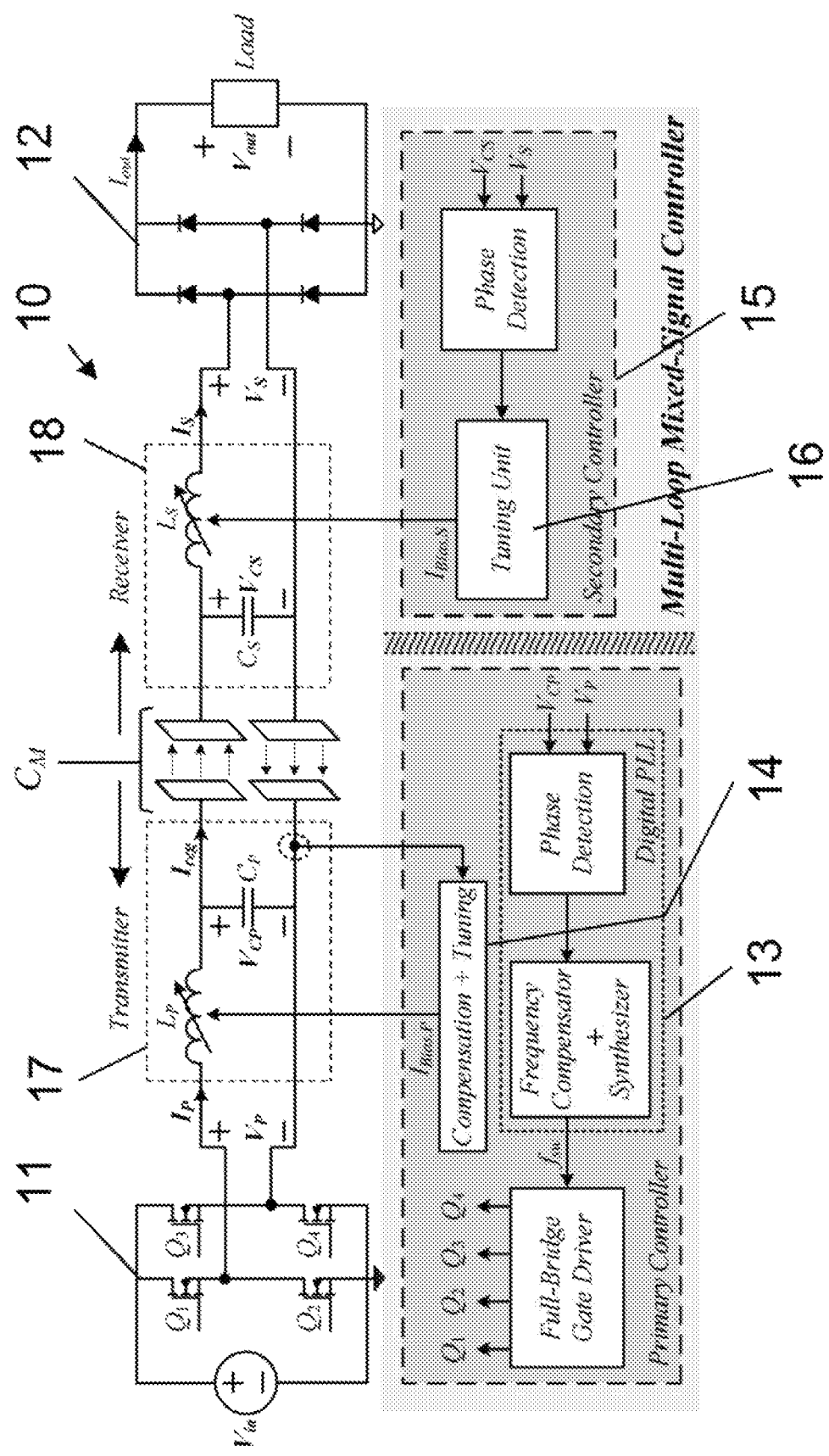
FIG. 1 schematically illustrates a schematic block diagram of a double-sided LC capacitive WPT system with an adaptive multi-loop controller, according to an embodiment of the disclosure.

FIG. 1 schematically illustrates a schematic block diagram of a double-sided LC capacitive WPT system with an adaptive multi-loop controller, according to an embodiment of the disclosure. The double-sided LC capacitive WPT system uses Closed-Loop Tuning with the adaptive multi-loop controller, through a resonant double-sided LC matching network. It should be noted, however, that the control algorithm is applicable for any CPT system.

Figure 14:
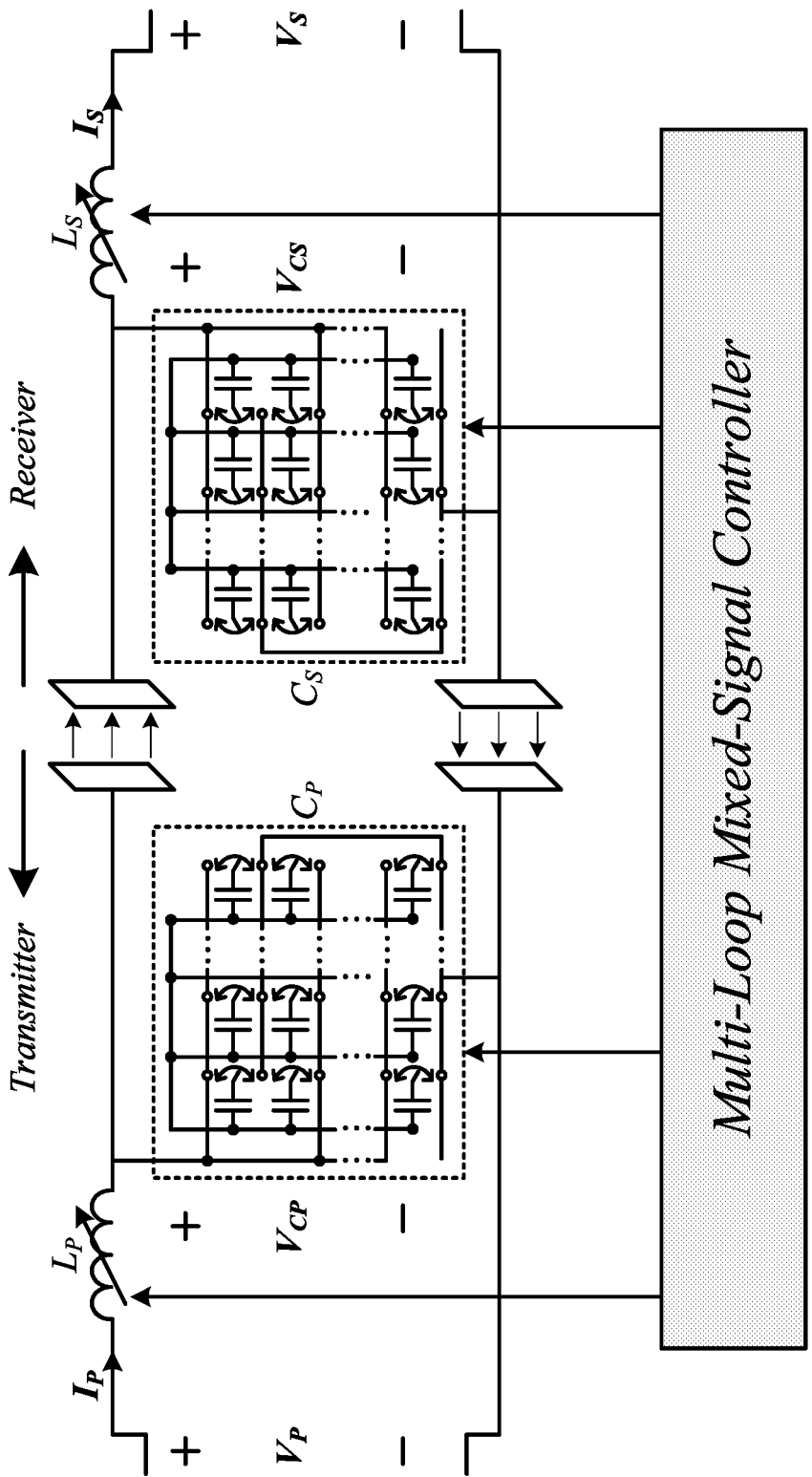
FIG. 14 shows an alternative method for the adaptation or tuning of the matching networks, according to another embodiment of the disclosure.

FIG. 14 shows an alternative method for the adaptation or tuning of the matching networks, according to another embodiment of the disclosure. In this embodiment, the system may also include variable capacitance, either in continuous or segmented arrangement. The addition varying capacitance, continuously or in segments, can also be utilized as an additional, independent, control loop that improves the efficiency or power transfer conditions of the resonant networks.

Double-Sided LC Matching Network

The system 10 is driven by a full-bridge inverter 11 on the primary side (Transmitter), and the load is fed via a diode rectifier 12 (a rectifier circuit) that is connected to the secondary's network (Receiver). Considering that the self-capacitances and the mutual coupling capacitance $C_M$ are lower than the total parallel capacitances $C_P$ and $C_S$, and that the drive frequency is near the matching networks' resonant frequency (i.e., $f_0 = (2\pi\sqrt{L_P C_P})^{-1} = (2\pi\sqrt{L_S C_S})^{-1}$), the currents, as well as voltages of the reactive elements are virtually sinusoidal, since high-Q operation is naturally facilitated as the output impedance of the network in the primary side is relatively high.

When resonant operation is satisfied, the primary current $I_P$ depends on the output voltage, and the secondary current, $I_S$, depends on the input voltage, and thus with the aid of system parameters, the currents can be expressed as $$I_P = \frac{\omega_0 C_P C_S}{\frac{C_M}{G}} V_S; \quad I_S = \frac{\omega_0 C_P C_S}{\frac{C_M}{G}} V_P, \quad (1)$$

where $\omega_0$ is the angular resonant frequency, $V_P$ and $V_S$ are the voltages of the primary and secondary, respectively.

Figure 2:
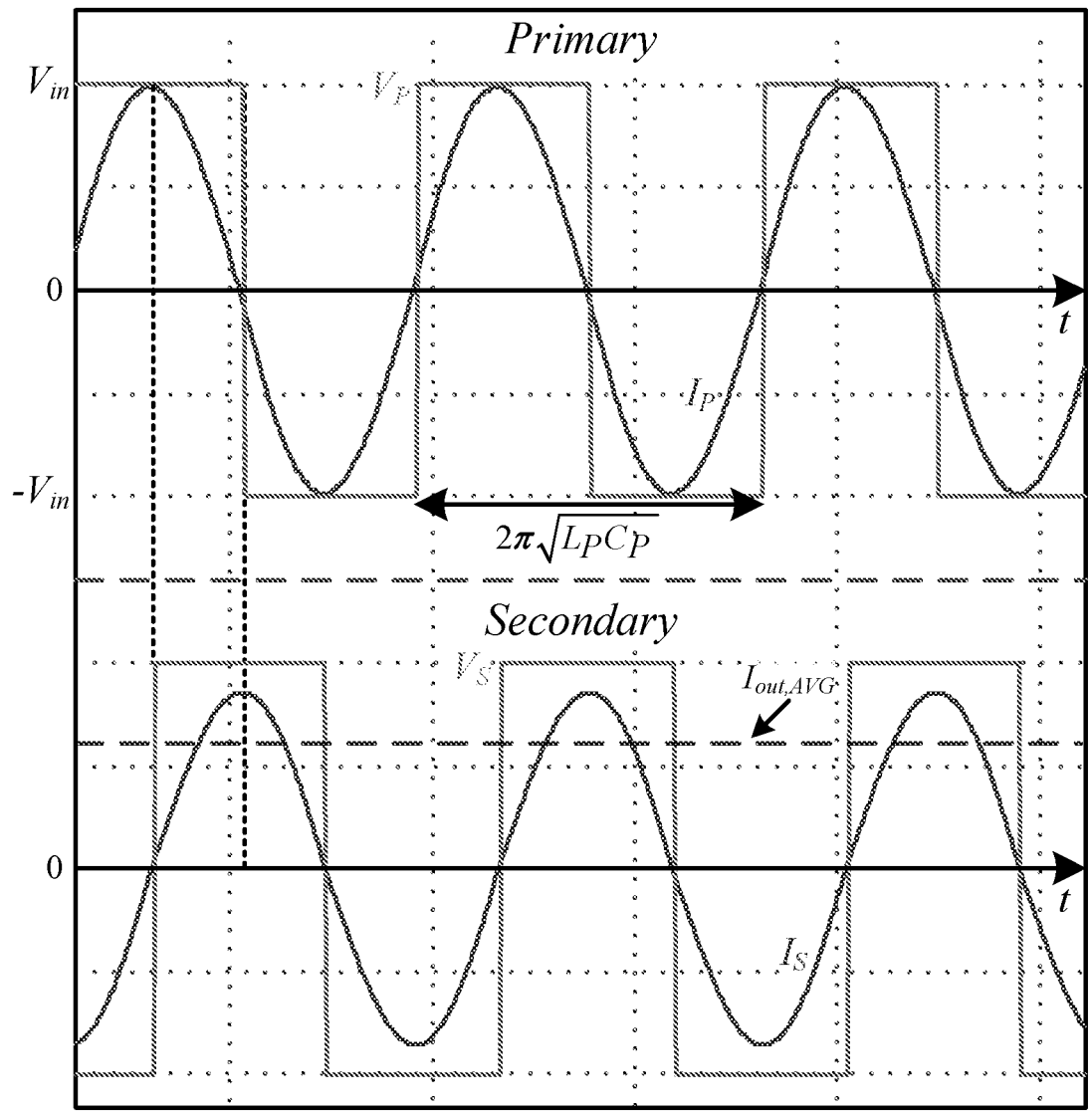
FIG. 2 shows typical waveforms of a CPT system.

FIG. 2 shows typical waveforms of a CPT system. As described, while the primary and secondary voltages $V_P$ and $V_S$ are square waves, the currents are sinusoidal due to high-Q operation of the circuit. Since a full-bridge inverter 11 is used at the front-end, the primary voltage $V_P$ varies between $V_{in}$ to $-V_{in}$. It can be also seen, that for both the primary and secondary sides, the current is in phase with the voltage, whereas the secondary voltage $V_S$ lags the primary voltage $V_P$ by 90°.

Figure 3:
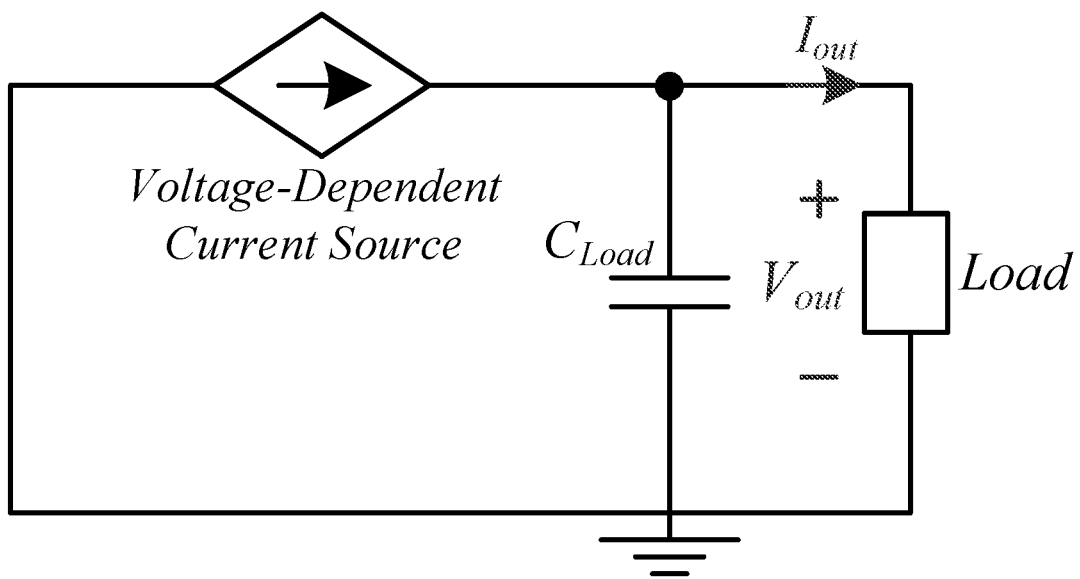
FIG. 3 illustrates a simplified behavioral model for the output side of the CPT system, according to an embodiment of the disclosure.

From (1), it can be seen that the double-sided LC CPT system 10 can be described by a two-port network with gyrator characteristics 0, with a trans-conductance gain G. FIG. 3 illustrates a simplified behavioral model for the output side of the CPT system 10. This implies that the dynamic behavior of the overall system can be characterized as a voltage-dependent current source. By employing fundamental harmonics approximation method on (1), the average value of the output current $I_{out}$ is expressed as a function of the input voltage V, as follows $$I_{out,AVG} = \frac{8}{\pi^2} \frac{\omega_0 C_P C_S}{C_M} V_{in}, \quad (2)$$

thus, the average output power $P_{out}$ can be expressed as $$P_{out} = \left(\frac{8}{\pi^2} \frac{\omega_0 C_P C_S}{C_M} V_{in}\right)^2 R_{Load}. \quad (3)$$

Controller Operation

In light of the above, an adaptive controller that monitors, tunes, and enables to continuously deliver constant current to the receiving side is proposed by the present disclosure.

Returning back to FIG. 1, power regulation is facilitated by three major control loops as shown in FIG. 1, with two control loops 13 and 14 at the primary side, while a third loop 15 is located at the secondary circuit. The control loops are distinguished by their control objectives and bandwidth requirements, such that the operating characteristics of the WPT system are satisfied. The first control loop 13 resembles in structure to a digital phase-locked loop (DPLL) that synthesizes a switching frequency $f_{sw}$, which continuously follows (tracks) the resonant frequency of the primary side $f_0$, even under variations of the system parameters. This ensures in this LC configuration that the power conversion characteristics of the networks are optimized.

Compensating for changes in the mutual coupling capacitance $C_M$ coupling medium due to movements between $C_M$ plates (i.e., movement of the secondary circuit with respect to the primary circuit) requires compensation by varying the drive frequency off the specific optimized point and correcting the network parameters accordingly. This can be achieved by adjusting a network inductor, capacitor or both. In this example, an approach based on variable inductor is employed.

In the example of FIG. 1, the primary adaptive matching network 17 is comprised of a primary resonant circuit with a bias-controlled variable primary inductor $L_P$, serially connected to the mutual capacitance $C_M$ and a capacitor $C_P$, parallely connected to the mutual capacitance $C_M$, for regulating the current flowing to said secondary side via the mutual capacitance $C_M$. The secondary adaptive matching network 18 is comprised of a secondary resonant circuit with a bias-controlled variable secondary inductor $L_S$, serially connected to the mutual capacitance $C_M$ and a capacitor $C_S$, parallely connected to the mutual capacitance $C_M$. However, it should be noted that in a more general configuration, the primary adaptive matching network 17 may comprise a primary resonant circuit with a first bias-controlled variable reactance (which may be a variable capacitor or a variable inductor or a combination thereof), serially connected to the mutual capacitance $C_M$ and a second bias-controlled variable reactance (which may be a variable capacitor or a variable inductor or a combination thereof), parallely connected to the mutual capacitance $C_M$, for regulating the current flowing to said secondary side via the mutual capacitance $C_M$. The secondary adaptive matching network 18 may comprise of a secondary resonant circuit with a third bias-controlled variable reactance (which may be a variable capacitor or a variable inductor or a combination thereof), serially connected to the mutual capacitance $C_M$ and a fourth bias-controlled variable reactance (which may be a variable capacitor or a variable inductor or a combination thereof), parallely connected to the mutual capacitance $C_M$.

The second control loop 14 adjusts the resonant frequency of the primary resonant circuit to track the switching frequency $f_{sw}$, by providing appropriate bias to the primary inductor and change the resonant frequency of the primary resonant circuit. The second control loop 14 comprises a current compensator and a tuning unit, that adjusts the inductance value of $L_P$ such that a target constant current (as well as power) is obtained. This transforms the primary circuit into a self-tuned architecture, in which the drive (switching) frequency tracks the resonant frequency on the fly, and the transmitted power is regulated by the resonant circuit's characteristics.

A third compensation loop 15, located in the receiver side, comprises a tuning unit that adjusts the inductance value $L_S$ of the secondary side inductance, according to the resonant operating frequency of the system, which is determined by the first control loop 13.

Figure 15:
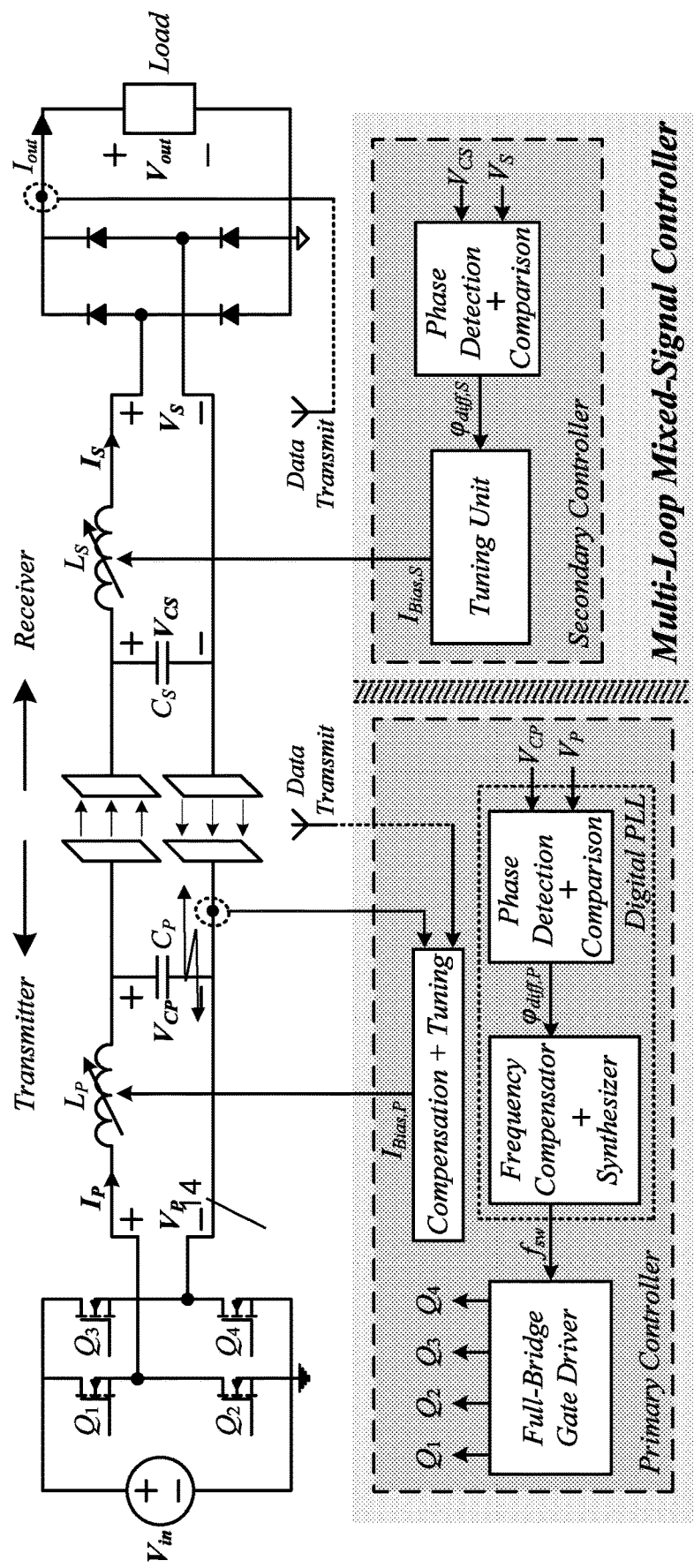
FIG. 15 shows an additional embodiment, according to which an optional fourth feedback loop is added for the cases that direct regulation of the secondary's output voltage is desired.

FIG. 15 shows an additional embodiment, according to which an optional fourth feedback loop is added for the cases that direct regulation of the secondary's output voltage is desired. As can be seen that in this case, the reference assignment for the transmitted current is controlled by information from the output of the secondary side. In this example, the output voltage Vout across the load is sampled and wirelessly transmitted to current control loop 14.

Figure 4:
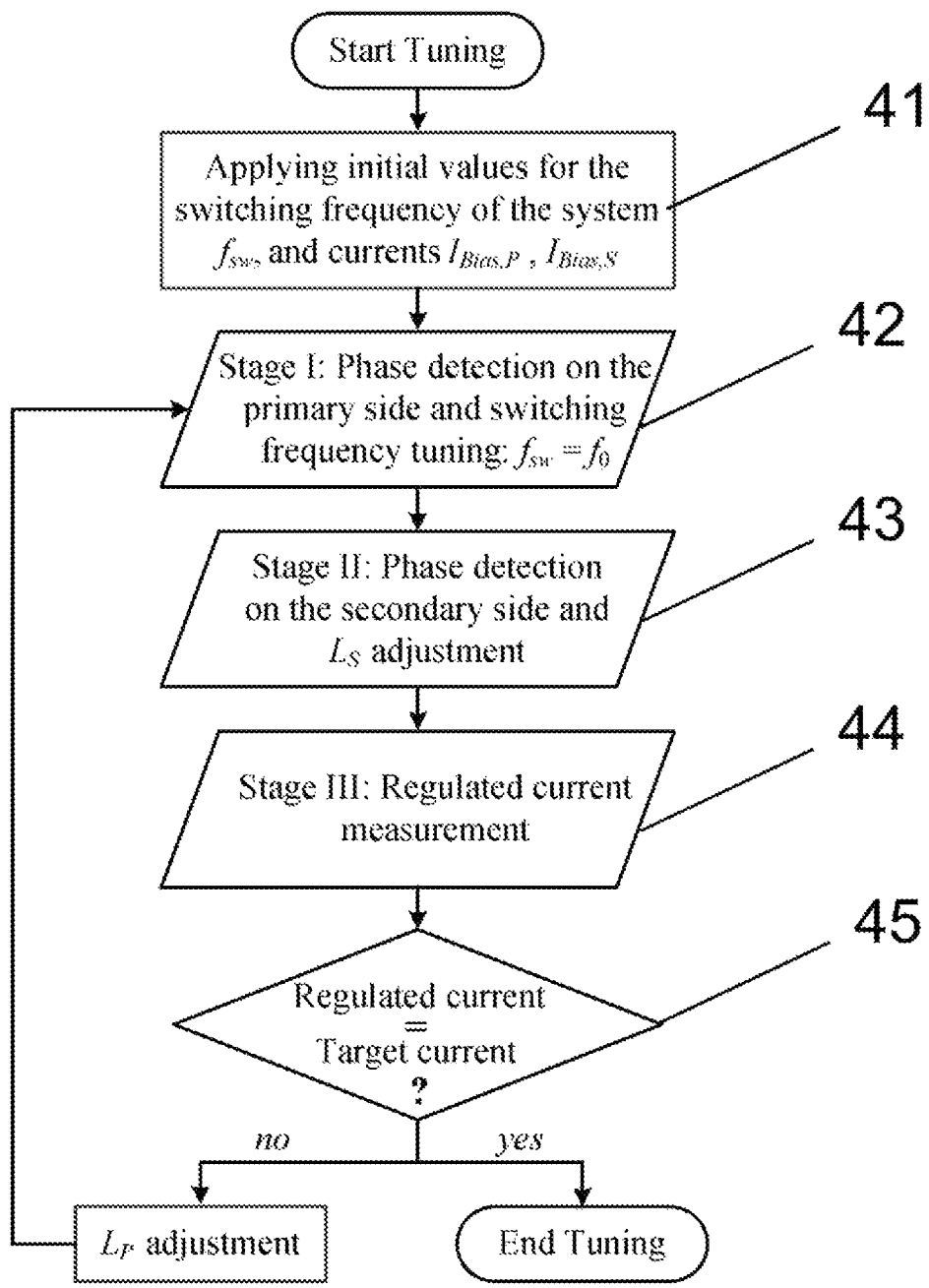
FIG. 4 is a flowchart of the tuning procedure that utilizes the three control loops, according to an embodiment of the disclosure.

FIG. 4 is a flowchart of the tuning procedure that utilizes the three control loops 13-15. When the tuning procedure is initiated, at step 41 a default set of pre-loaded values are used to determine the switching frequency $f_{sw}$, and the variable inductors $L_P$ and $L_S$. These values are determined by the target operating conditions of the system. The adaptive tuning operation is conducted per feedback loop. First, the switching frequency to drive the full-bridge is being tuned by the first control loop (DPLL) 13, where its inputs are the voltages $V_P$ and $V_{CP}$, such that a phase difference between the signals is detected at step 42. To guarantee that the switching frequency $f_{sw}$ follows the resonant frequency $f_0$ for any given variations of the primary circuit, a 90° phase angle between $V_P$ and $V_{CP}$ is maintained at all times. In case when the detected phase difference between the signals is not 90°, an error signal is generated to the DPLL frequency compensator and generates a new switching frequency until $f_{sw}=f_0$.

At the next step 43 of the tuning process, a phase difference between $V_S$ and $V_{CS}$ is detected and is maintained at 90° and the secondary side's inductance value, $L_S$ is adjusted to tune the secondary matching network, according to the switching frequency $f_{sw}$ of the primary side. The correction signal in this case adjusts the inductance value $L_s$ rather than the drive frequency $f_{sw}$ (which has been determined by the primary circuit). This is carried out by a driver that feeds the bias winding of the inductor, until the network is at resonance (until $f_{sw}=f_0$) and the phase difference between the signals $V_S$ and $V_{CS}$ equals 90°. At the final step 44, the regulated current $I_{reg}$ (see FIG. 1) from the primary circuit is sensed and compared to a target/reference current. The tuning unit 16 generates a correction signal that effectively adjusts the inductance $L_P$ through bias winding until the desired current is achieved. It should be noted that the inductance tuning (to adjust the transfer current) results in different resonant characteristics of the system, and consequently, the frequency tuning loop 13 operates to lock the switching frequency to the new resonant frequency.

To satisfy proper operation with reasonable dynamics of this multi-loop scheme, the compensators are decoupled by their bandwidth. The frequency tracking loop 13, is designed to be with highest bandwidth within the controller, i.e., responds the fastest among the multiple control loops. The frequency loop is followed by the secondary's loop 15, which is also designed to be a relatively high-bandwidth loop compared to current control loop 14. This design assures that the faster loop is virtually transparent to its following loops and by doing so, significantly simplifies the system dynamics and complexity of the compensators.

Figure 5A:
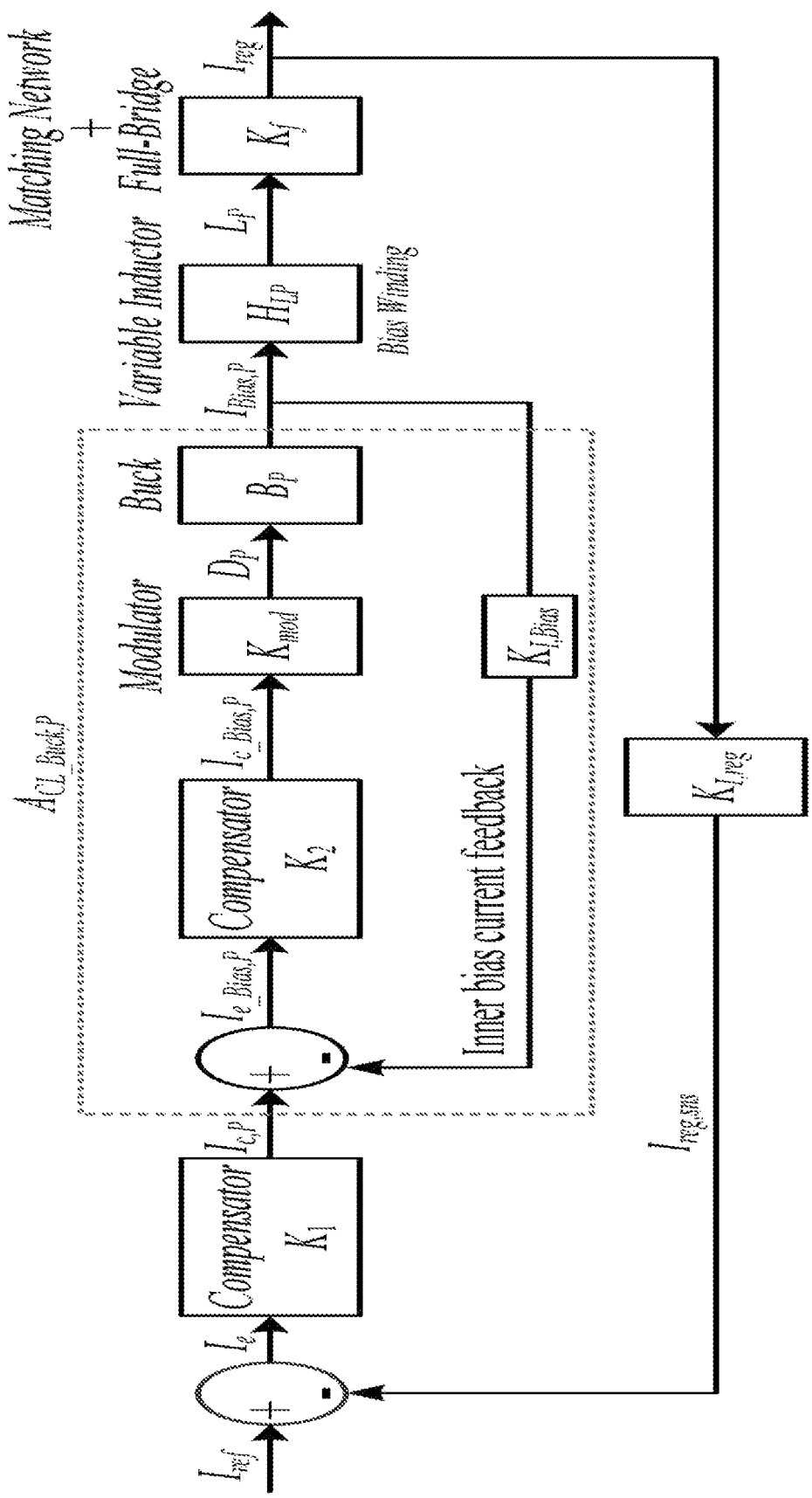
FIGS. 5A-5C are simplified functional block diagrams that describe the dynamic behavior of this self-tuned system, according to an embodiment of the disclosure.
Figure 5B:
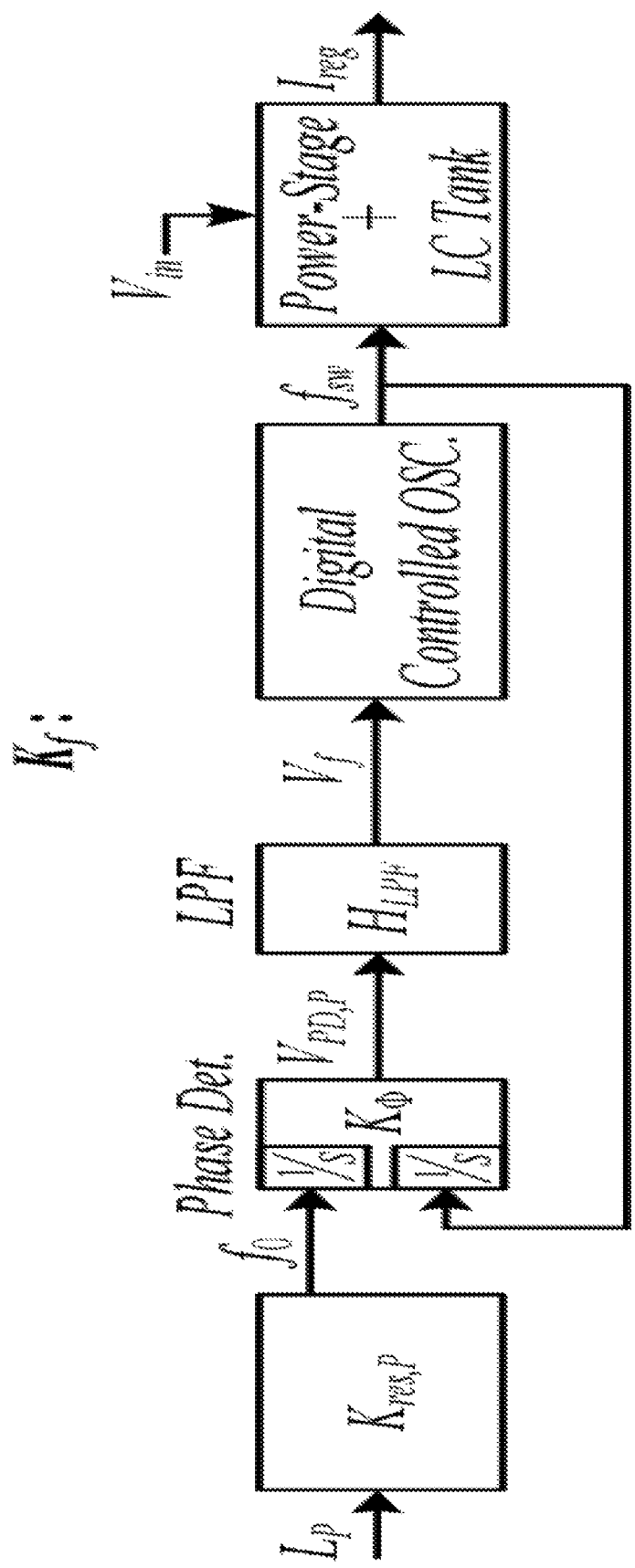
Figure 5C:
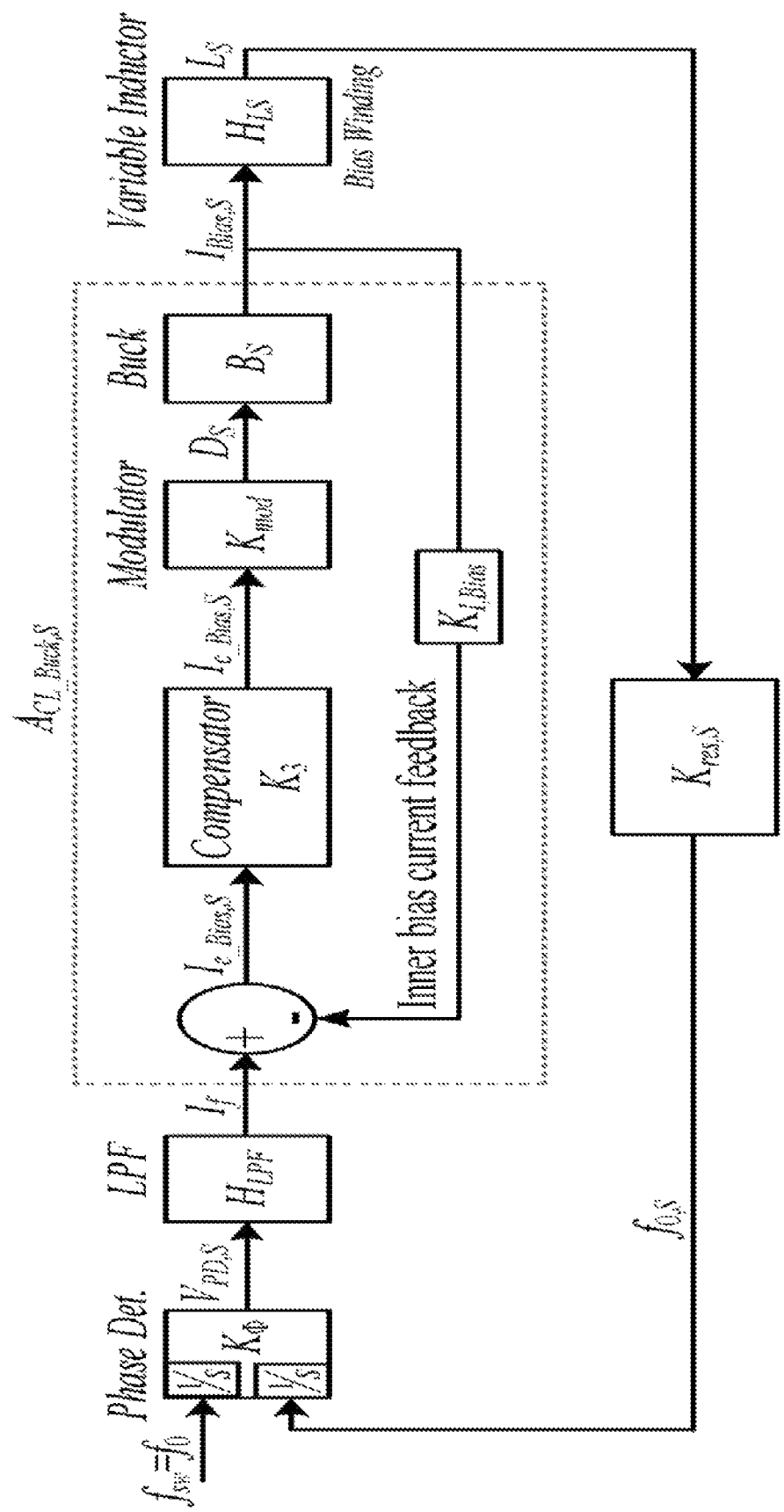

FIGS. 5A-5C are simplified functional block diagrams that describe the dynamic behavior of this self-tuned system. The block diagrams comprise both linear and non-linear transfer functions to reflect the specific operation of each 'transformation unit' (i.e., 'block').

FIGS. 5A-5B of the primary control circuit includes two major loops to satisfy current sourcing behavior to the transfer plates. FIG. 5C illustrates a third, independent loop that is located at the secondary side, to adjust the receiving network to the signal's frequency. In addition, for both the primary and secondary circuits, the bias driver of the variable inductors is designed as a closed feedback loop configuration to maintain a forced current control. This enables to reduce the order of the outer feedback loop, and therefore, allows simple stabilization of the overall system. By employing a self-calibrating frequency loop and adjusting the system parameters, regulation of the primary's output current, $I_{reg}$, can be achieved at the same time that the system is kept at resonance (while soft-switching conditions are met).

Starting from the left side of FIG. 5A, $I_{ref}$ is a proportional representation of the target regulated current from the primary to the secondary, where $I_{c,P}$ represents the correction signal generated by the current compensator, and $I_{e\_Bias,P}$ is the error signal of the inner bias current loop. $K_{mod}$ stands for the transfer ratio of the modulator, i.e., bias current correction signal, $I_{c\_Bias,P}$ to duty-cycle of the bias current driver. The bias driver has been realized by a buck converter, and its transfer function is represented in the block diagrams by $B_P$. The bias current for the inductor L can be expressed as $$I_{Bias,P} = D_P B_P(s) = \frac{D_P V_{Buck}}{sL_{Bias} + R_{DCR}}, \qquad (4)$$

where $L_{Bias}$ is the inductor of the buck converter, $R_{DCR}$ is the DC resistance of the inductor, and $D_P$ and $V_{Buck}$ are the duty-cycle and the input voltage of the buck converter, respectively. After linearization, the small signal transfer function between the duty-cycle and the inductor current $b_P(s)$ is expressed as $$b_P(s) = \frac{i_{Bias,P}}{d_P} = \frac{V_{Buck}}{sL_{Bias} + R_{DCR}}, \qquad (5)$$

where $i_{Bias,P}$ is the small signal bias current and $d_P$ is the duty-cycle perturbation. Thus, the closed-loop transfer function of the buck converter is $$A_{CL\_Buck,P}(s) = \frac{i_{Bias,P}}{i_{c,P}} = \frac{K_2 K_{mod} b_P}{1 + K_{1,Bias} K_2 K_{mod} b_P}, \qquad (6)$$

where $K_2$ is the gain of the compensator and $K_{I,Bias}$ is the gain due to the bias current sensing.

$H_{LP}$ represents the bias winding such that the relationship between the bias current and the primary side inductance is $$L_P = H_{LP}(I_{Bias,P}). \qquad (7)$$

The relationship of $H_{LP}(I_{Bias,P})$ can be obtained by experimental measurements, advanced simulation tools such as Maxwell, or by analytical analysis. Thus, a local linearization around the operating point determines the non-linear small signal of $H_{LP}$ as follows $$h_{LP} = \frac{dL_P(I_{Bias,P})}{dI_{Bias,P}} = \frac{H_{LP}(I_{Bias,P0}) - H_{LP}(I_{Bias,P0} + \Delta I_{Bias,P})}{\Delta I_{Bias,P}}, \qquad (8)$$

where $I_{Bias,P0}$ is the nearest measure value of the bias current for a given operating point, and $\Delta I_{bias,P}$ is the increment between the two nearest measured values of the bias current around the operating point. Finally, $K_f$ is the response of the matching network combined with power-stage to the variable inductor generated by $H_{LP}$ (the ratio of the regulated current $I_{reg}$ to a change of the resonant characteristics), and $K_{I,reg}$ is the gain due to the regulated current sensing.

FIG. 5B details the transfer characteristics of $K_f$. The output of H dictates the resonant frequency $f_0$ of the CPT system such that $$K_{res,P}(L_P) = f_0 = \frac{1}{2\pi \sqrt{\frac{H_{LP}(I_{Bias,P})C_P}{L_P}}}. \qquad (9)$$

Considering $H_{LP}(I_{Bias})$ is constant, a derivation of the large signal $K_{res,P}(L_P)$ around the operating point yields the small signal transfer function of the resonant tank 0:

$$k_{res,P} = \frac{df_0}{dL_P}\bigg|_{L_P(I_{Bias,P0})} = -\frac{1}{2L_{P0}}f_0. \qquad (10)$$

where $L_{P0}$ is the primary's resonant inductor value around the operating point. Assuming that the frequency tuning is the fastest control loop within the system, $f_0$ is continuously compared to the switching frequency $f_{sw}$ of the full-bridge to guarantee that $f_{sw}=f_0$. $K_\Phi$ represents the gain of the phase detector, and consequently, the phase detector can be described as a module that includes two integrators at the input that translates frequencies into phases and a gain block. The outcome of the phase detection operation, $V_{PD,P}$, can be expressed as $$V_{PD,P} = K_\Phi \varphi_{diff,P} = \frac{V_{DD}}{\pi} \varphi_{diff,P}, \qquad (11)$$

where $V_{DD}$ is the supply voltage of the phase detector, and $\varphi_{diff,P}$ is the phase difference between the target resonant frequency and the drive switching frequency signals (which are obtained by the signals $V_P$ and $V_{CP}$). $V_{PD,P}$, which represents a proportional phase mismatch between the inputs of the phase detector for every switching cycle of the system, is filtered by a lag-lead Low-Pass Filter (LPF) network that is represented in the continuous domain as $$H_{LPF}(s) = \frac{1 + sCR_2}{1 + sC(R_1 + R_2)}, \qquad (12)$$

Therefore, the zero frequency is always higher than the pole frequency. By doing so, the stability of the Digital Controlled Oscillator (DCO) is improved since its phase margin can be increased compared to a simple LPF. The voltage $V_f$ is then translated by the Digital Controlled Oscillator (DCO) unit to a drive frequency for the power-stage combined with the LC tank, which in turn generates the desired target current.

FIG. 5C is a functional block diagram of the secondary's control loop. The operating resonant frequency of the system is compared by a phase detector to the resonant frequency of the secondary, $f_{0,S}$. It should be noted that for stable operating CPT system $f_{0,S}=f_{sw}=f_0$. Similar to the above given relationships of the primary side, the output signal of the secondary's phase detector $V_{PD,S}$ is given by $$V_{PD,S} = K_\Phi \varphi_{diff,S} = \frac{V_{DD}}{\pi} \varphi_{diff,S}, \tag{13}$$

where $\varphi_{diff,S}$ is the phase difference between the primary's and secondary's resonant frequencies (which are obtained by the signals $V_S$ and $V_{CS}$). $V_{PD,S}$ is filtered and translated to a current representation $I_f$, which with the aid of the inner bias current feedback $I_{Bias,S}$ for the variable inductor $L_S$, generates the modulation signal $D_S$ for the buck converter. $I_{Bias,S}$, $L_S$ and $K_{res,S}$ are expressed in a similar manner to $I_{Bias,P}$, $L_P$ and $K_{res,P}$. By sensing the buck current and feeding the signal back to inner compensation, the dynamic effect of the bias loop is eliminated. The resultant inductance value of $L_S$ dictates a new resonant frequency $f_{0,S}$ until the phase difference $\varphi_{diff,S}$ equals 90°, implying that the transmitting and receiving sides are matched, and the system is operating under optimal power transfer conditions.

To assure reasonable dynamics of the multiple feedback loops, for a given quality factor Q, assuming that $f_{sw}$ is locked on $f_0$ the bandwidth of this loop is determined as follows $$BW_1 = f_{sw}/2Q. \tag{14}$$

The secondary's control loop is also relatively a high-bandwidth loop and is set as a fraction of $BW_1$, typically a good practice is one-third (⅓) to one-tenth (⅒). The outer current loop is set to be with slowest dynamics within the controller, typically one-ninth (⅑) to one-fiftieth (1/50) of the switching frequency of the system. By doing so, the loops are decoupled and tuning procedure does not depend on preceding information or data of the system to facilitate closed-loop operation.

Implementation of a Variable Inductor

Figure 6B:
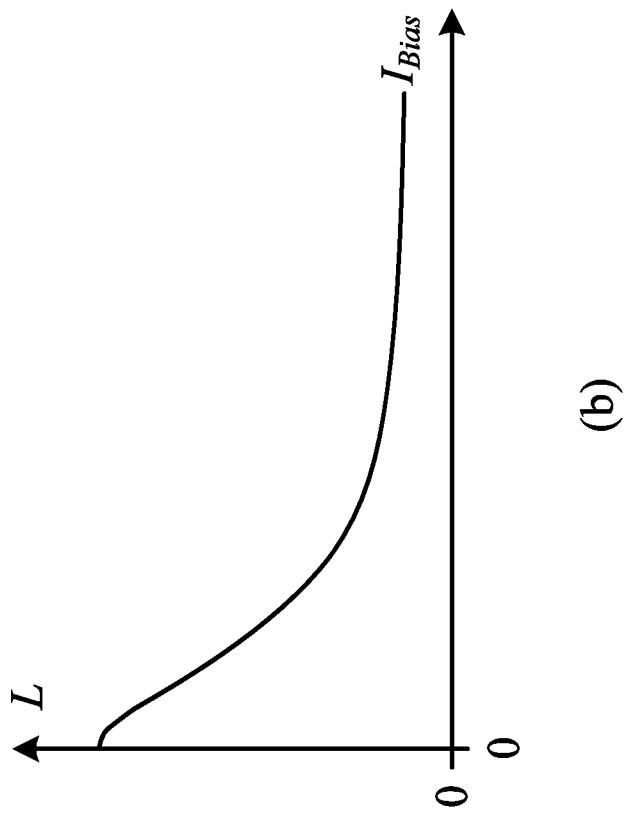
FIG. 6B illustrates passing DC current through the auxiliary winding and saturating a portion of the core, resulting in variable inductance.
Figure 6A:
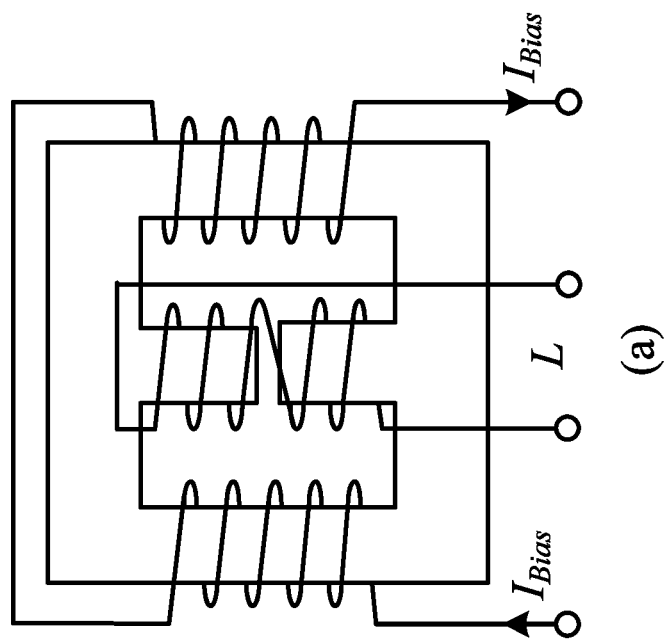
FIG. 6A shows one possible implementation of a variable inductor.

FIG. 6A shows one possible implementation of a variable inductor, where a magnetic structure is described with the ability to change the inductance of the inductor independent of other power transfer circuit parameters. The magnetic structure comprises an E-core type magnetic element, whereas the primary inductor is constructed on the middle, gapped leg. The bias/control winding is formed on the outer, non-gaped legs, and their windings are connected in series but with opposite polarity. By doing so, the AC coupling between the center leg and the bias winding is cancelled. Passing DC current through the auxiliary winding would partially saturate this portion of the core, resulting in variable inductance, as illustrated by FIG. 6B.

The inductance value L can be found using several design parameters such as: number of turns n, air-gap $l_g$, and the effective magnetic path length $l_e$, and thus, the expression of L can be expressed as $$L = \frac{n^2 \mu_0 A_e}{l_e} \frac{\mu_r(I_{Bias})}{1 + 2\frac{l_g}{l_e} \mu_r(I_{Bias})}, \tag{15}$$

where $\mu_0$ is the air permeability, $\mu_r$ is the magnetic core permeability, and $A_e$ is the core area. $\mu_r$ depends on the bias current $I_{Bias}$ and can be obtained from either the manufacturer data or by experiment. A simplistic expression of $\mu_r$ is given by $$\mu_r(I_{Bias}) = \frac{\mu_{mi}}{1 + (H(I_{Bias})/H_{pole})^j}, \tag{16}$$

where $\mu_{mi}$ is the permeability initial value, i.e., $\mu_{mi} = \mu_r(H=0)$, $H_{pole}$ is the magnitude of the saturation field and j sets the permeability slope. The variable H is proportional to the bias current, and is expressed as follows $$H(I_{Bias}) = nI_{Bias}/l_e. \tag{17}$$

Limit-Cycle Oscillations in Digitally Controlled Resonant Converters

When designing closed-loop resonant based WPT systems, limit-cycle oscillations which resulted from the presence of the quantizing units of the controller, such as analog-to-digital converter (ADC) and the DCO (assuming the compensators does not add quantization error), must be considered. Primary cause for limit-cycle oscillations in resonant converters is that the input-output gain is not constant and varies as a function of the frequency. In capacitive WPT systems, which operate at resonance, the effective impedance is very high due to the coupling plates, and a very high parallel quality factor Q is considered, which translates to a very high voltage gain. In addition, one of the key parameters to successfully regulating the power is that the system locks on the resonant frequency. However, to guarantee optimal power transfer conditions, soft-switched operation should be satisfied, so as to generate a drive frequency which is slightly above the resonant frequency. This objective requires very sensitive calibration which may also result in limit-cycle oscillations, since in resonant converters the frequency resolution highly depends on operating conditions and the location of the drive frequency with respect to the network's resonance.

Since the quality factor Q is not constant and depends on the capacitive medium characteristics (distance, alignment, etc.), it affects the input-output gain of the system. Therefore, to assure proper operation, worst case of the resolution sensitivity should be considered, i.e., the highest Q that the system might have. Thus, the ADC and DCO units have been designed such that limit-cycle oscillations are remedied. A key criterion for determining the existence of limit-cycle oscillations in resonant systems relies on the comparison between the LSB value (i.e., resolution) of the ADC and the output signal variation due to a LSB change of the control, i.e., a necessary condition for no limit cycles is that the variation of the output $\Delta S_{out}$, due to a LSB change of control is smaller than the ADC resolution $\Delta_{ADC}$ 0

$$\Delta S_{out} < \Delta_{ADC} = \frac{V_{ADC}}{2^{N_{ADC}}}, \tag{18}$$

where $V_{ADC}$ and $N_{ADC}$ are the ADC's reference voltage and number of bits, respectively.

Digitally synthesized frequency is normally carried out by timers that are programmed to reset at a desired value, while maintaining a fixed 50% duty ratio. The generated frequency can be expressed by $$f_{DCO} = \frac{1}{N_{per}TB}, \quad (19)$$

where $N_{per}$ is an integer and TB is the time base of the unit clock. The frequency resolution can be calculated as the LSB change in $N_{per}$ $$\Delta f_{DCO} = \frac{1}{N_{per}TB} - \frac{1}{(N_{per}-1)TB} \approx \frac{1}{N_{per}^2 TB} = TB f_{DCO}^2. \quad (20)$$

From (20), it can be observed that the frequency steps of the DCO are limited by the system clock frequency, and increase as the square of the operating frequency. Consequently, at lower running frequency, the frequency resolution would be finer than what can be achieved at a higher frequency. In the case that finer resolution than the one obtained by the system DCO is required, an effective fast dynamics and low distortion frequency dithering procedure has been employed.

Phase Detector

Figure 7:
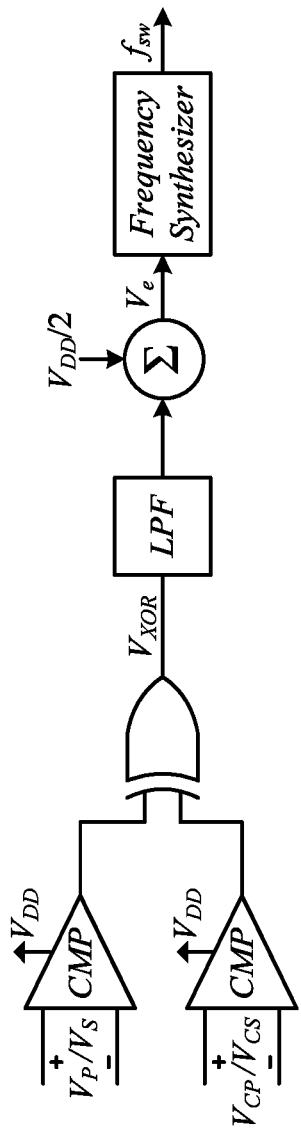
FIG. 7 illustrates possible realization of phase detection for both the transmitting and receiving sides.
Figure 8A:
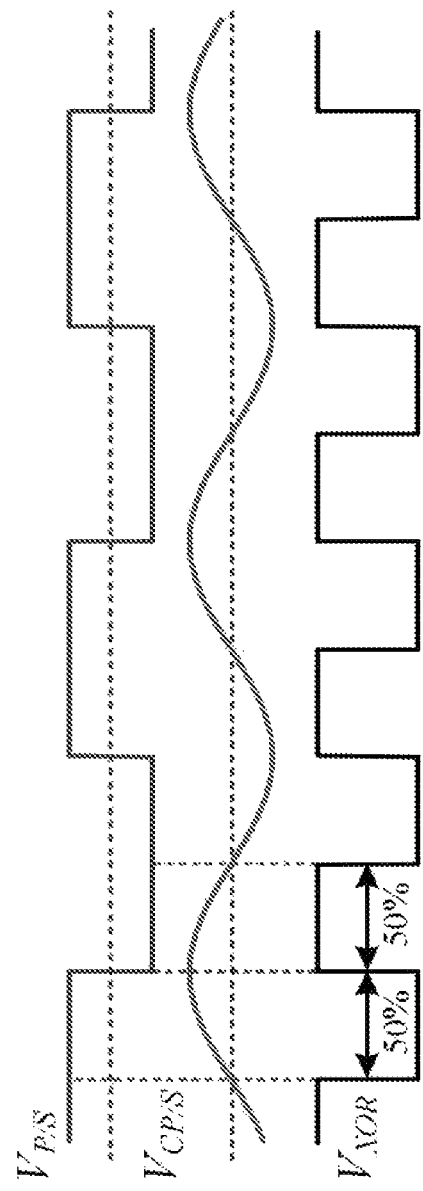
FIG. 8A shows the phase difference between the signals under resonant operation.
Figure 8B:
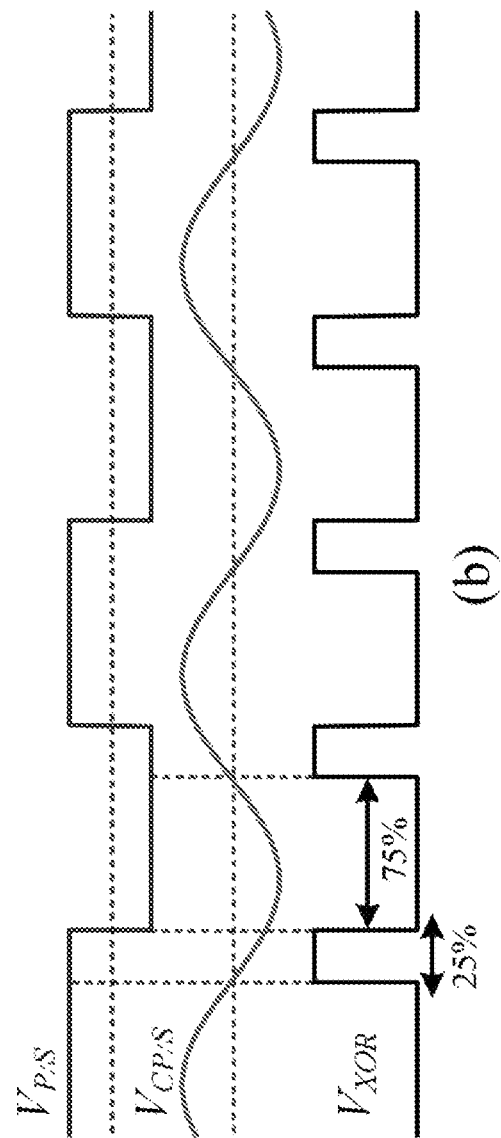
FIG. 8B shows the phase difference between the signals when the resonant condition is not satisfied.

FIG. 7 illustrates possible realization of phase detection for both the transmitting and receiving sides. Typically, in capacitive WPT systems the voltages of the resonators are significantly higher than the operating voltage levels of the controller periphery. Therefore, the input voltages $V_P$ and $V_{CP}$ ($V_S$ and $V_{CS}$) are scaled down using a simple high-resistance divider network to a voltage level suitable for the phase detector unit. The sensed high-frequency scaled voltages are fed into a comparator that acts as zero-cross detector. Then, the digital represented signals of the zero-cross detection are fed into an exclusive-or (XOR) operator. Inherently, under resonant operation the phase difference between the signals is 90°, as shown in FIG. 8A. Consequently, the output of the XOR, $V_{XOR}$, is a square wave with 50% duty-ratio and a doubled frequency. $V_{XOR}$ is passed through a LPF, resulting in a voltage that is proportional the phase angle magnitude, which for the resonant operation equals exactly $V_{DD}/2$(assuming the voltage supply of logic is $V_{DD}$), which is then synthesized to the resonant operating frequency. In case that resonant operation is not satisfied (as shown in FIG. 8B), where the duty-ratio of $V_{XOR}$ is 25%, thus the output of the filter is lower than $V_{DD}/2$, and as a result, a corrected switching frequency is synthesized until it equals to the resonant frequency. Practically, any phase shift between the two measured voltage signals results in some constant offset that should be calibrated out. Thus, to minimize phase offset errors, similar voltage scaling should be employed for both signals as much as possible.

Current-Sensing Circuitry

Figure 9:
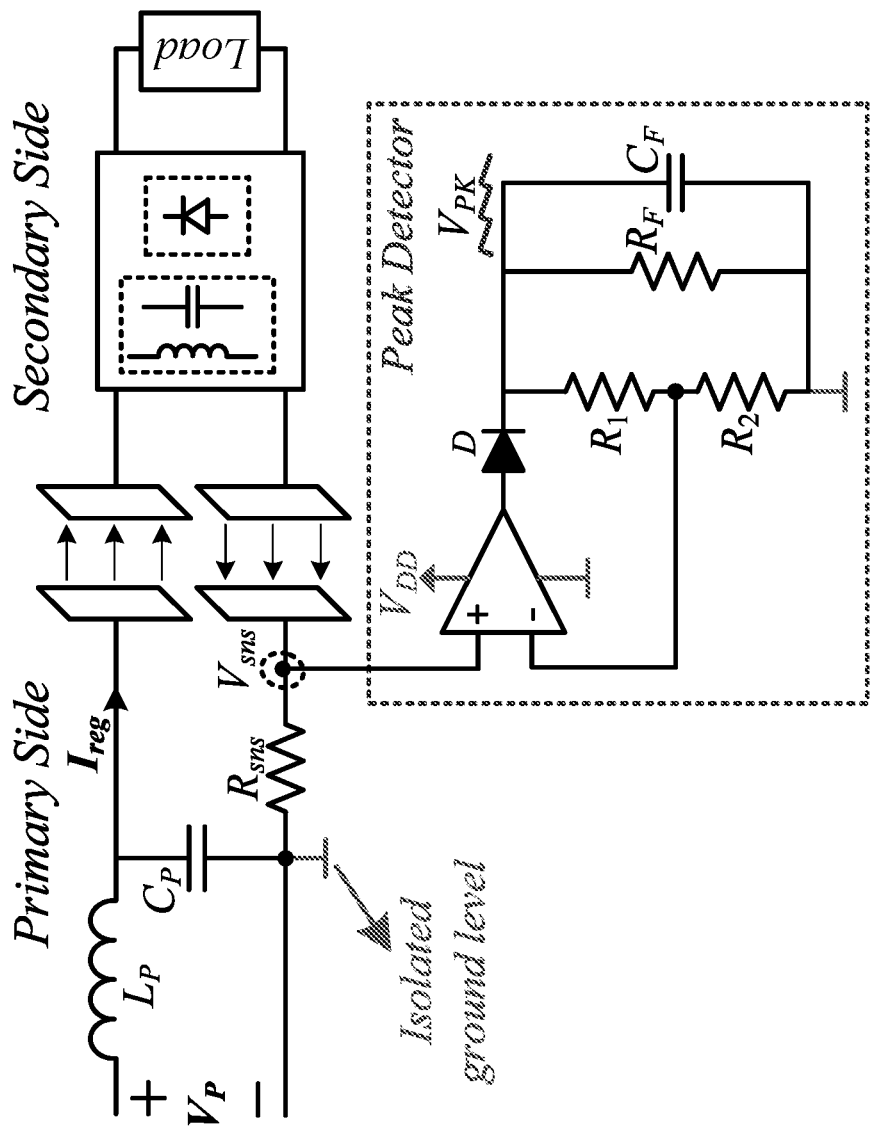
FIG. 9 shows a current-sensing circuit, based on a peak detector mechanism, comprised of a simple half wave rectifier configuration.

The multi mixed-signal controller requires various measurements of the operating conditions in the WPT system. A key measurement of the system is the regulated current, $I_{reg}$, to the capacitive medium. However, this high-frequency current is not trivial to measure and sensing techniques such as current transformer and filter-sense may result in a complex sensing circuitry. The current-sensing employed by the present disclosure is based on a peak detector mechanism is comprised of a simple half wave rectifier configuration, as shown in FIG. 9. The sensed current converted to a proportional voltage suitable signal, $V_{sns}$, by flowing through the resistor $R_{sns\_0}$. The peak detector is implemented around an operational amplifier to compensate for the voltage drop on the rectifying diode D. To reduce the losses related to the diode, a Schottky diode is used primarily due to its relatively low forward voltage and zero reverse recovery time, further improving the sensor performance. The time constant of the peak detector is selected approximately ten times the period of the sensed sinusoidal signal to both filter out the ripple, and smoothly follow the peak value of the signal. The peak detector configuration enables reduced sampling rate requirements of the ADC, and therefore reduces its power consumption. Another benefit of this sensing circuitry is that it also provides information for over-current protection (OCP) and can be used for fault protection of the system.

A key feature of the sensors of the implemented CPT system, in particular of the current sensing circuitry, is to provide an isolated ground reference level to the sense resistor as well as the peak detector circuit (FIG. 9). By doing so, the limitations due to sensing relative to a floating voltage node are eliminated, in addition, this configuration also improves the signal to noise ratio.

Over-Voltage Protection

Figure 10:
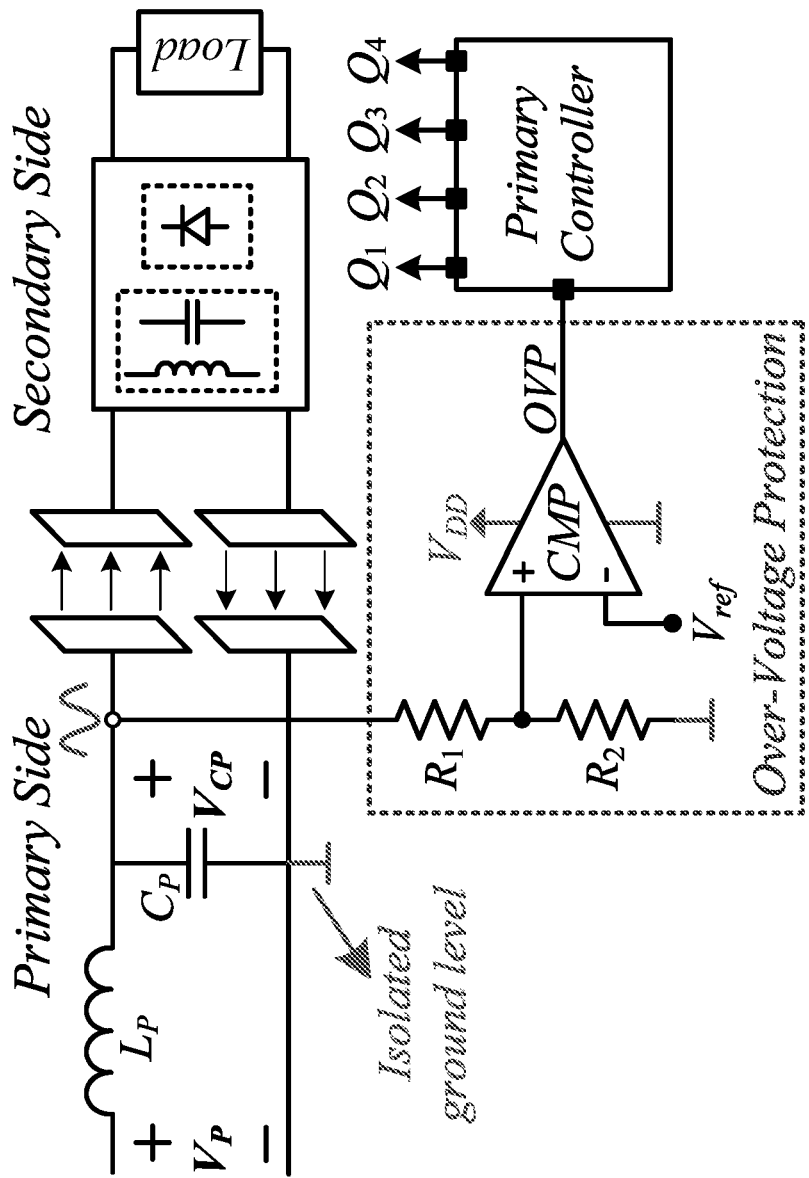
FIG. 10 illustrates the implementation of an Over-Voltage Protection (OVP) mechanism.

As mentioned in the phase detection, the voltage across the resonating capacitors is very high particularly in such high-Q operation. Thus, to avoid any potential failure risks of the CPT system due to over-voltage in the vicinity of the coupler, an Over-Voltage Protection (OVP) mechanism has been implemented, as illustrated by FIG. 10. Similar to phase detection process, the voltage $V_{CP}$ is sensed and scaled down by a high-resistance divider network to voltage levels suitable for the comparator operation. The scaling of $V_{CP}$ and the value of the reference voltage, $V_{ref}$, are determined according to the highest voltage allowed across the capacitor $C_P$, i.e., across the coupling plates. For a case that $V_{CP}$ is higher than the reference voltage, the comparator output is fed to the primary's controller disabling the gate drive signals ($Q_1$-$Q_4$), and as a result the system is turned off, until it is being reset. This also allows avoiding undesired safety concerns due to arcing and high electric fields around the coupling plates.

The coupling plates have been designed symmetrically, such that each plate is 30×30 cm. The matching networks have been also designed to be symmetrical; in nominal operation the inductors' values are set to $L_P=L_S\approx75$ pH and the matching capacitors $C_P=C_S=250$ pF. The operating frequency slightly above the resonance $f_0\approx1.2$ MHz, guaranteeing soft-switching. High-voltage multilayer SMD ceramic capacitors have been used for the matching capacitors $C_P$ and $C_S$. The full-bridge inverter has been implemented with GaN power devices operable in several MHz. The overall nominal operating conditions and parameters of the experimental prototype are summarized in Table 1.

TABLE 1

EXPERIMENTAL PROTOTYPE
PARAMETERS AT NOMINAL OPERATION

| Parameter | Value/Type |
|---|---|
| Input voltage $V_{in}$ | 30 V |
| Output current | 1 A |

TABLE 1-continued

EXPERIMENTAL PROTOTYPE
PARAMETERS AT NOMINAL OPERATION

| Parameter | Value/Type |
|---|---|
| Coupling plates | 30 × 30 cm |
| Air-gaps | 15-100 mm |
| Full-bridge transistors | LMG5200, 80 V, 15 mΩ, Dual |
| Variable inductors $L_P$ and $L_S$ | ~75 μH |
| Capacitors $C_P$ and $C_S$ | 250 pF, TDK 810 series |
| Operating frequency $f_0$ | 1.2 MHz |

Figure 11:
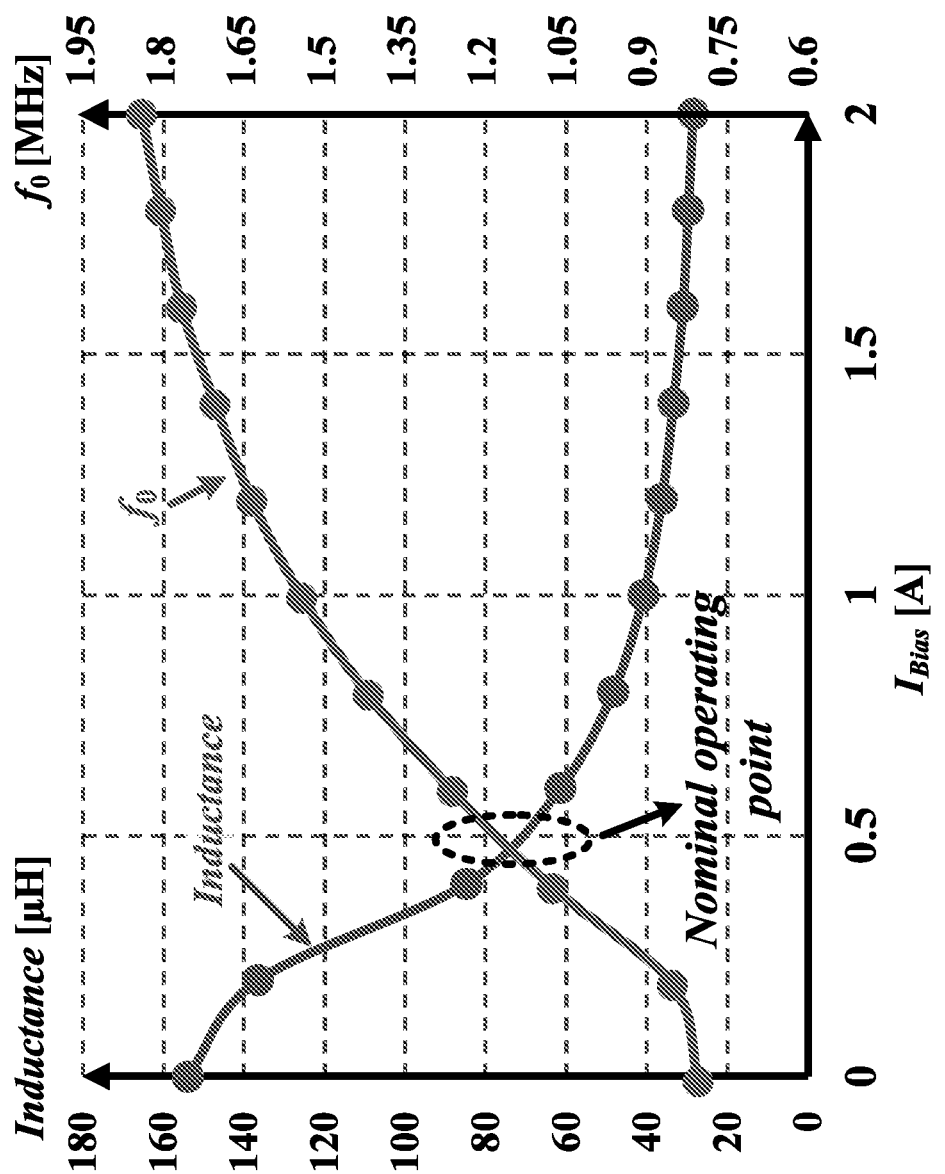
FIG. 11 shows the measured results for varying the bias current in the range of 0 to 2 A.

The first step of the experimental validation has been carried out by characterizing the inductance of the variable inductor, and the resulting operating frequency of the CPT prototype as a function of the bias current. FIG. 11 shows the measured results for varying the bias current in the range of 0 to 2 A. It can be seen that in the vicinity of the nominal operating conditions the inductance and operating frequency $f_0$ are approximately 75 pH and 1.2 MHz, respectively, for a bias current of 0.5 A.

Figure 12A:
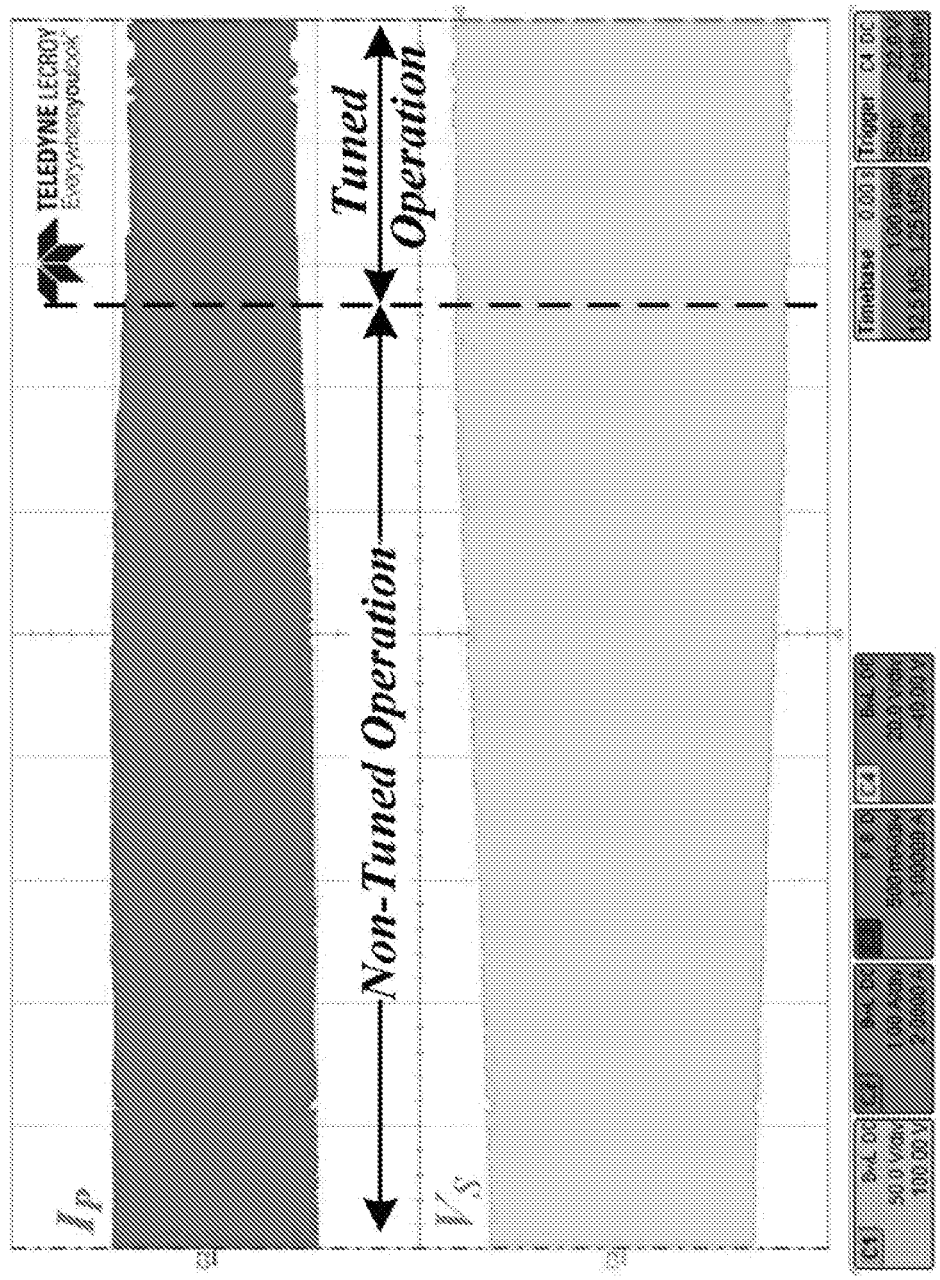
FIG. 12A shows the behavior of the primary's current $I_P$ and the secondary's voltage $V_S$ during tuning process for an input voltage $V_{in}$=30 V.

FIG. 12A shows the behavior of the primary's current $I_P$ and the secondary's voltage $V_S$ during tuning process for an input voltage $V_{in}$=30 V. It can be observed that initially, the system is not tuned and the regulated current on the primary side has higher peak amplitude compared to the one at the end of the tuning procedure. This is due to the fact that at the beginning the system is not calibrated and best operating conditions are not satisfied, thus undesired circulating current is drawn from the power source. On the other hand, at the end of the tuning procedure the voltage $V_s$ has higher peak amplitude, since the system is calibrated to resonance and is operated under (local) optimal power transfer conditions according to the target current.

Figure 12B:
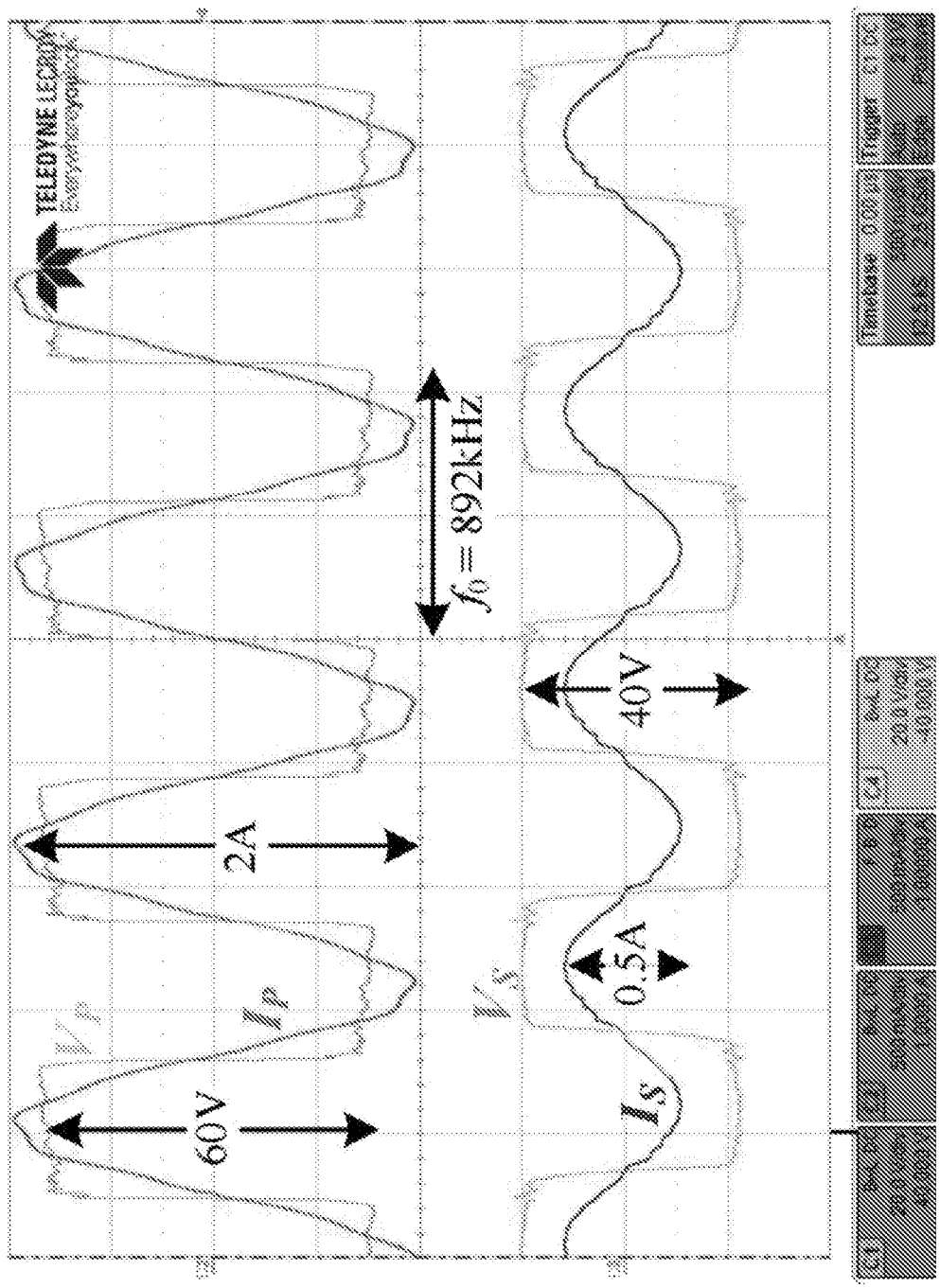
FIG. 12B shows zoomed-in views of the tuning process with the waveforms of the switching nodes voltages and resonant currents upon initialization.
Figure 12C:
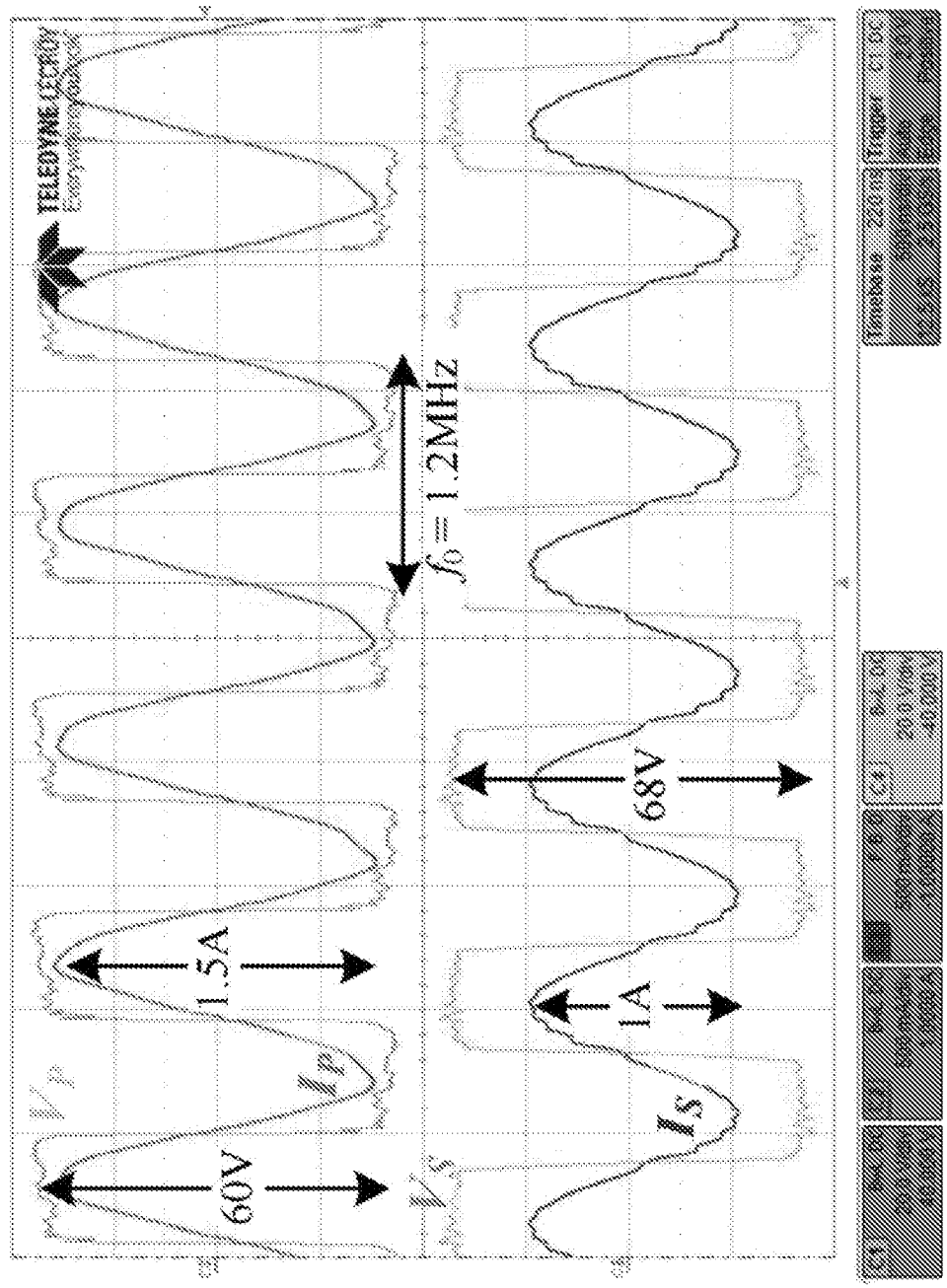
FIG. 12C shows zoomed-in views of the tuning process with the waveforms of the switching nodes voltages and resonant currents at the end of the tuning process.

FIG. 12B and FIG. 12C show zoomed-in views of the tuning process with the waveforms of the switching nodes voltages and resonant currents upon initialization and the end (FIG. 12C) of the tuning process. It can be seen that the switching frequency increases from 892 kHz to 1.2 MHz. The output parameters ($I_S$ and $V_S$) also increase by more than 2.5 times, delivering more energy to the load, while the transfer efficiency has improved considerably (over 25% improvement). In addition, it can also be noticed that the primary current $I_P$ is slightly lagging the primary voltage $V_P$, which is the necessary condition to enable soft-switching operation.

Figure 13A:
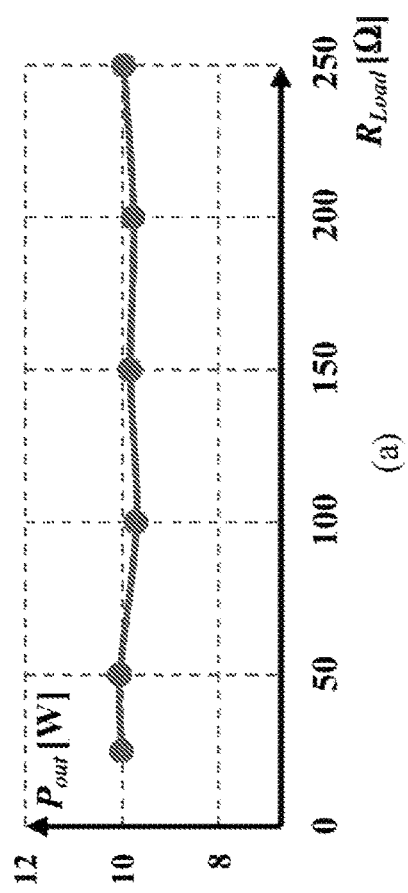
FIG. 13A shows the effectiveness of the new multi-loop controller for a target power of 10 W over various output load resistances, with coupling capacitance $C_M \approx 20$ pF.
Figure 13B:
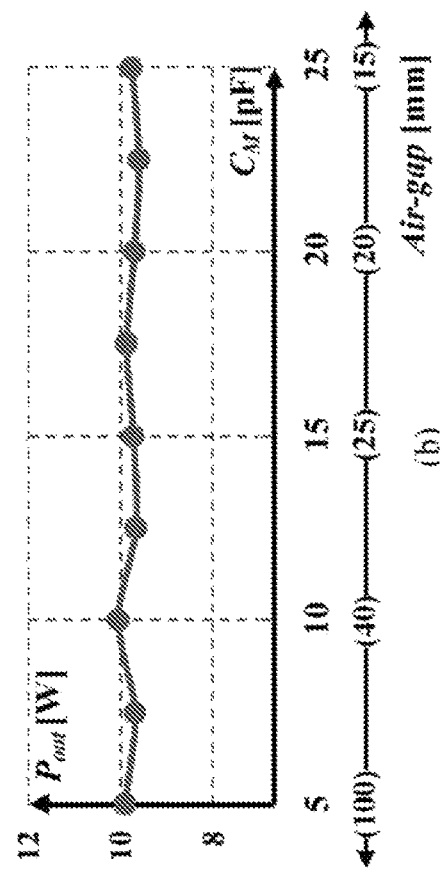
FIG. 13B shows the effectiveness of the new multi-loop controller for a target power of 10 W over various output load resistances for varying coupling capacitance $C_M$ (varying airgaps between coupling plates of $C_M$)

To further demonstrate the effectiveness of the new multi-loop controller for capacitive WPT systems and showcase of the quality of the performance in closed-loop operation, the experimental prototype has been also tested for a target power of 10 W over various output load resistances, whereas the coupling capacitance $C_M$≈20 pF, as shown in FIG. 13A. A virtually constant power delivery is obtained throughout the load range. In the experiment of FIG. 13B, the coupling capacitance has been varied to demonstrate the closed-loop operation under variations in the distance or displacement of the coupling plates. The experiment has been conducted with constant load resistance of $R_{Load}$≈100 0, and varying the coupling plates' air-gaps up to the range of 100 mm, this translates to capacitance range of approximately 5 pF to 25 pF. Similar to the variable load test, it can be seen that, aside from measurement deviation, the output power is well regulated at a constant value. These two measurements validate the closed-loop operation of the self-tuned CPT system, which provides regulated power delivery regardless the medium or load variations.

Although embodiments of the disclosure have been described by way of illustration, it will be understood that the disclosure may be carried out with many variations, modifications, and adaptations, without exceeding the scope of the claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCES

[1] Z. Zhang, H. Pang, A. Georgiadis, and C. Cecati, "Wireless power transfer—An overview," *IEEE Trans. Ind. Electron.*, Early Access, 2018.

[2] T. Imura and Y. Hori, "Maximizing air gap and efficiency of magnetic resonant coupling for wireless power transfer using equivalent circuit and Neumann formula," *IEEE Trans. Ind. Electron.*, vol. 58, no. 10, pp. 4746-4752, October 2011.

[3] T. Langlotz, T. Nguyen, D. Schmalstieg, and R. Grasset, "Next generation augmented reality browsers: Rich, seamless, and adaptive," in *Proc. IEEE*, vol. 102, no. 2, pp. 155-169, February 2014.

[4] D. Xu, L. Han, M. Tan, and Y. F. Li, "Ceiling-based visual positioning for an indoor mobile robot with monocular vision," *IEEE Trans. Ind. Electron.*, vol. 56, no. 5, pp. 1617-1628, May 2009.

[5] S. Li and C. Mi, "Wireless Power Transfer for Electric Vehicle Applications," *IEEE Journal of Emerging and Selected Topics in Power Electronics*, vol. PP, pp. 1-1, 2014.

[6] S. Jaegue et al., "Design and implementation of shaped magnetic resonance-based wireless power transfer system for roadway-powered moving electric vehicles," *IEEE Trans. Ind. Electron.*, vol. 61, no. 3, pp. 1179-1192, March 2014.

[7] K. Wu, D. Choudhury, and H. Matsumoto, "Wireless power transmission, technology, and applications" *Proceedings of the IEEE*, Vol. 101, no. 6, pp. 1271-1275, June 2013.

[8] L. Collins, "Cut the cord," *Electron. Syst. Softw.*, vol. 5, no. 6, pp. 42-46, January-December 2007.

[9] F. Musavi and W. Eberle, "Overview of wireless power transfer technologies for electric vehicle battery charging," *IET Power Electronics*, vol. 7, no. 1, pp. 60-66, 2014.

[10] M. P. Theodoridis, "Effective capacitive power transfer," *IEEE Trans. Power Electron.*, vol. 27, no. 12, pp. 4906-4913, December 2012.

[11] F. Lu, H. Zhang, H. Hofmann, and C. Mi, "A double-sided LCLC compensated capacitive power transfer system for electric vehicle charging," *IEEE Trans. Power Electron.*, vol. 30, no. 11, pp. 6011-6014, June 2015.

[12] H. Zhang, F. Lu, H. Hofinann, W. Liu, and C. C. Mi, "A four-plate compact capacitive coupler design and LCL-compensated topology for capacitive power transfer in electric vehicle charging application," *IEEE Trans. Power Electron.*, vol. 31, no. 12, pp. 8541-8551, December 2016.

[13] F. Lu, H. Zhang, H. Hofmann, C. Mi, "A loosely coupled capacitive power transfer system with LC compensation circuit topology," *Proc. IEEE Energy Convers. Congr. Expo. (ECCE)*, pp. 1-5, 2016.

[14] F. Lu, H. Zhang, C. Mi, "A two-plate capacitive wireless power transfer system for electric vehicle charging Applications," *IEEE Trans. Power Electron*, vol. 33, no. 2, pp. 946-969, August 2017.

[15] F. Lu, H. Zhang, H. Hofinann, and C. Mi, "A double-sided LC compensation circuit for loosely-coupled capacitive power transfer," *IEEE Trans. Power Electron.*, vol. 33, no. 2, pp. 1633-1643, February 2017.

[16] J. Dai and D. C Ludois, "A survey of wireless power transfer and a critical comparison of inductive and capacitive coupling for small gap applications," *IEEE Trans. Power Electron*, vol. 30, no. 11, pp. 6017-6029, November 2015. [17] B. Lee, M. Kiani, and M. Ghovanloo, "A triple-loop inductive power transmission system for biomedical applications," *IEEE Trans. Biomed. Circuits Syst.*, vol. 10, no. 1, pp. 138-148, February 2016.

[18] Y. Lim, H. Tang, S. Lim, J. Park, "An adaptive impedance-matching network based on a novel capacitor matrix for wireless power transfer," *IEEE Transactions on Power Electronics*, vol. 29, no. 8, pp. 4403-4413, August 2014.

[19] T. C. Beh, M. Kato, T. Imura, S. Oh and Y. Hori, "Automated impedance matching system for robust wireless power transfer via magnetic resonance coupling," *IEEE Transactions on Industrial Electronics*, vol. 60, no. 9, pp. 3689-3698, September 2013.

[20] H. Li, J. Li, K. Wang, W. Chen, and Y. Xu, "A maximum efficiency point tracking control scheme for wireless power transfer systems using magnetic resonant coupling," *IEEE Trans. Power Electron.*, vol. 30, no. 7, pp. 3998-4008, July 2015.

[21] P. Si, A. P. Hu, S. Malpas, D. Budgett, "A frequency control method for regulating wireless power to implantable devices," *IEEE Trans. on Biomedical Circuits and Systems.*, vol. 2, no. 1, pp. 22-29, March. 2008.

[22] T. D. Yeo, D. Kwon, S. T. Khang, and J. W. Yu, "Design of maximum efficiency tracking control scheme for closed-loop wireless power charging system employing series resonant tank," *IEEE Trans. Power Electron.*, vol. 32, no. 1, pp. 471-478, January 2017.

[23] K. Lu, S. K. Nguang, S. Ji, and L. Wei, "Design of auto frequency tuning capacitive power transfer system based on class-E 2 dc/dc converter," *IET Power Electronics*, vol. 10, no. 12, pp. 1588-1595, 2017.

[24] M. Kline, I. Izyumin, B. Boser, and S. Sanders, "Capacitive power transfer for contactless charging," in *Proc. IEEE Appl. Power Electron. Conf Expo.*, 2011, pp. 1398-1404.

[25] B. H. Waters, A. P. Sample, J. R. Smith, "Adaptive impedance matching for magnetically coupled resonators," in *Proc. Prog. Electromagn. Res. Symp.*, 2012, pp. 694-701.

[26] M. Pinuela, D. C Yates, S. Lucyszn, and P. D. Mitcheson, "Maximizing dc-to-load efficiency for inductive power transfer," *IEEE Trans. Power Electron.*, vol. 28, no. 5, pp. 2437-2447, May 2013.

[27] S. Sinha, A. Kumar, S. Pervaiz, B. Regensburger and K.K. Afridi, "Design of efficient matching networks for capacitive wireless power transfer systems," *Proceedings of the IEEE Workshop on Control and Modeling for Power Electronics (COMPEL)*, Trondheim, Norway, June 2016.

[28] A. Kumar, S. Sinha, A. Sepahvand, K. K. Afridi, "Improved design optimization for high-efficiency matching networks," *IEEE Transactions on Power Electronics*, vol. 33, no. 1, pp. 37-50, January 2018.

[29] S. Sinha, A. Kumar, K. K. Afridi, "Improved design optimization of efficient matching networks for capacitive wireless power transfer systems," in *Proc. IEEE Appl. Power Electron. Conf Expo. (APEC)*, March 2018, pp. 3167-3173.

[30] J. Kim and J. Jeong, "Range-adaptive wireless power transfer using multiloop and tunable matching techniques," *IEEE Trans. Ind. Electron.*, vol. 62, no. 10, pp. 6233-6241, October 2015.

[31] J. G. Hayes and M. G. Egan, "Rectifier-compensated fundamental mode approximation analysis of the series parallel LCLC family of resonant converters with capacitive output filter and voltage-source load," *Proceedings of the IEEE Power Electronics Specialists Conference (PESC)*, Charleston, S.C., July 1999.

[32] S. Y. R. Hui, W. Zhong, and C. K. Lee, "A critical review of recent progress in mid-range wireless power transfer," *IEEE Trans. Power Electron.*, vol. 29, no. 9, pp. 4500-4511, September 2014.

[33] R. L. Steigerwald, "A comparison of half-bridge resonant converter topologies," *IEEE Transactions on Power Electronics*, vol. 3, no. 2, pp. 174-182, April 1988.

[34] Y. H. Sohn, B. H. Choi, G. H. Cho, and C. T. Rim, "Gyrator-Based Analysis of Resonant Circuits in Inductive Power Transfer Systems," *IEEE Transactions on Power Electronics*, vol. 31, no. 10, pp. 6824-6843, October 2016.

[35] S. Ben-Yaakov and M. M. Peretz, "A self-adjusting sinusoidal power source suitable for driving capacitive loads," *IEEE Trans. Power Electron.*, vol. 21, no. 4, pp. 890-898, July 2006.

[36] E. Abramov, T. Vekslender, O. Kirshenboim, and M. M. Peretz, "Fully-integrated digital average current-mode control voltage regulator module IC," *IEEE Journal on Emerging and Selected Topics in Power Electronics*, vol. 6, no. 2, pp. 549-562, June 2018.

[37] K. Kalita, J. Handique, T. Bezboruah, "Modelling and behavioral simulation of a high-speed phase-locked loop for frequency synthesis," *IET Signal Processing*, vol. 6, no. 3, pp. 195-204, May 2012.

[38] S. S. Ahsanuzzaman, T. McRae, M. M. Peretz, and A. Prodic, "Low volume buck converter with adaptive inductor core biasing," in *Proc. IEEE Appl. Power Electron. Conf Expo. (APEC)*, February 2012, pp. 335-339.

[39] O. Ezra and M. M. Peretz, "Magneto-electro-mechanical modeling of magnetic actuation systems," in *Proc. IEEE Applied Power Electronics Conference and Exposition (APEC)*, 2015, pp. 2628-2634.

[40] S. Ben-Yaakov, M. M. Peretz, "Simulation bits: a SPICE behavioral model of non-linear inductors," *IEEE Power Electronics Society Newsletter*, Fourth Quarter, pp. 9-10, 2003.

[41] M. M. Peretz and S. Ben-Yaakov, "Digital control of resonant converters: resolution effects on limit cycles," *IEEE Trans. on Power Electronics*, vol. 25, no. 6, pp. 1652-1661, 2010.

[42] S. R. Sanders, "On limit cycles and describing function method in periodically switched circuits," *IEEE Trans. Circuits Syst.*, vol. 40, no. 9, pp. 564-572, September 1993.

[43] H. Peng, A. Prodic, E. Alarcon, and D. Maksimovic, "Modeling of quantization effects in digitally controlled dc-dc converters," *IEEE Trans. Power Electron.*, vol. 22, no. 1, pp. 208-215, January 2007

[44] M. M. Peretz and S. Ben-Yaakov, "Digital control of resonant converters: enhancing frequency resolution by dithering," in *Proc. IEEE Applied Power Electronics Conference and Exposition (APEC)*, February 2009, pp. 1202-1207.

[45] C. Xiao, L. Zhao, T. Asada, W. G. Odendaal, and J. D. van Wyk, "An overview of integratable current sensor technologies," in *Proc. Conf Rec. Ind. Appl.*, 2003, vol. 2, pp. 1251-1258.

[46] H. P. Forghani-zadeh, G. A. Rincon-Mora, "Current-sensing techniques for DC-DC converters," in *Proc. IEEE Midwest Symposium. Circuits and Systems*, vol. 2, pp. 577-580, August 2002.

[47] E. Abramov, M. Evzelman, O. Kirshenboim. T. Urkin, and M. M, Peretz, "Low voltage sub-nanosecond pulsed current driver IC for high-resolution LIDAR applications," in *Proc. IEEE Appl. Power Electron. Conf Expo. (APEC)*, March 2018, pp. 708-715.

[48] IEEE Standard for Safety Levels with Respect to Human Exposure to Radio Frequency Electromagnetic Fields, 3 kHz to 300 GHz, IEEE Standard C95.1, 2005.

[49] DE2 development and education board user manual, Altera Corporation, 2006.

[50] Texas Instrument: 'LMG5200 80-V, 10-A GaN Half-Bridge Power Stage' available at: http://www.ti.com/lit/ds/symlink/lmg5200.pdf, accessed March 2017.

The invention claimed is:

1. A controlled wireless Capacitive Power Transfer (CPT) system, based on adaptive matching networks, comprising:
   a) a primary power transmitter side for wirelessly transmitting power to a secondary power receiver side via coupling plates having mutual capacitance $C_M$,
   said primary power transmitter side comprising:
      a.1) a power source connected to a power driver operating at a determined switching frequency $f_{sw}$;
      a.2) a primary adaptive matching network comprised of a primary resonant circuit with a bias-controlled variable primary inductor serially connected to said mutual capacitance $C_M$ and a capacitor parallelly connected to said mutual capacitance $C_M$, for regulating a current flowing to said secondary power receiver side via said mutual capacitance $C_M$; and
      a.3) a primary controller comprised of:
         a.3.1) a first control loop, for adjusting the switching frequency $f_{sw}$ to compensate for changes in impedance of said primary adaptive matching network, whenever said mutual capacitance $C_M$ changes;
         a.3.1) a second control loop, for adjusting a resonant frequency of said primary resonant circuit to track the switching frequency $f_{sw}$ by providing appropriate bias to said bias-controlled variable primary inductor and changing the resonant frequency of said primary resonant circuit; and
   said secondary power receiver side comprising:
      b.1) a rectifier circuit connected to a load and operating at a resonant frequency of said primary resonant circuit;
      b.2) a secondary adaptive matching network connecting between said mutual capacitance $C_M$ and said rectifier circuit and comprising a secondary resonant circuit with a bias-controlled variable secondary inductor serially connected to said mutual capacitance $C_M$ and a capacitor parallelly connected to said mutual capacitance $C_M$ for matching an impedance of said secondary adaptive matching network;
      b.3) a secondary controller comprised of:
         b.3.1) a control loop, for adjusting the impedance of said secondary adaptive matching network to match the resonant frequency of said primary resonant circuit by providing appropriate bias to said bias-controlled variable secondary inductor.

2. A system according to claim 1, in which the first control loop is implemented by a digital phase-locked loop (DPLL).

3. A system according to claim 1, in which the switching frequency is synthesized to continuously follow the resonant frequency of the primary power transmitter side, in response variations of system parameters.

4. A system according to claim 1, in which power delivery from the primary power transmitter side to the secondary power receiver side is disengaged from cross-coupling interactions between said primary power transmitter and secondary power receiver sides and variations of electrical circuits and capacitive medium.

5. A system according to claim 1, in which power delivery from the primary power transmitter side to the secondary power receiver side is adaptively tuned to satisfy required power conditions at either terminals of the coupling plates or at output terminals.

6. A system according to claim 1, in which power delivery from the primary power transmitter side to the secondary power receiver side is adaptively tuned by adjusting the switching frequency and varying a value of one or more reactive components.

7. A system according to claim 1, in which the primary and/or secondary adaptive matching network includes a bias controlled or a command controlled variable inductance or capacitance, wherein said variable inductance or capacitance is varied continuously or in segments.

8. A system according to claim 1, in which the primary power transmitter side delivers constant current to the secondary power receiver side.

9. A system according to claim 1, in which the resonant frequency of the primary and secondary resonant circuits is adjusted by changing the values of the respective bias-controlled variable primary and secondary inductors or parallel capacitors or both.

10. A system according to claim 1, in which the switching frequency tracks the resonant frequency on the fly, and a transmitted power is regulated by characteristics of the primary resonant circuit.

11. A system according to claim 1, in which the primary and/or secondary resonant circuit comprises a plurality of inductors and capacitors in either series connection, parallel connection, or a combination of both series and parallel connections.

12. A system according to claim 1, in which the resonant circuit in each side comprises two or more variable components.

13. A system according to claim 1, in which the bandwidth of the first control loop is the highest bandwidth, to obtain the fastest response, wherein the bandwidth of the control loop of the secondary power receiver side is lower than the bandwidth of the first control loop, and the bandwidth of the second control loop is the lowest bandwidth.

14. A system according to claim 1, in which a bias driver of the bias-controlled variable primary and secondary inductors is realized by either a linear regulator or by a buck converter.

15. A system according to claim 14, in which a current of the bias driver is regulated by an internal closed-current-loop.

16. A system according to claim 1, in which the control loops are characterized by their bandwidth difference.

17. A system according to claim 1, in which a transmitted signal at output terminals of the primary power transmitter side is modulated, for transmitting power to a plurality of loads, each corresponding to the secondary power receiver side, such that each load will receive a transmitted power at a different frequency.

18. A system according to claim 1, in which a fourth feedback loop is employed to facilitate direct regulation of output characteristics through back communication from the secondary power receiver side to the primary power transmitter side, wherein said fourth feedback loop adjusts a signal transmitted from the primary power transmitter side until a desired transmitted signal is obtained.

19. A system according to claim 18, in which the secondary power receiver side comprises an independent tuning circuit.

20. A method for controlling power transfer in a Capacitive Power Transfer (CPT) system as defined in claim 1, comprised of the primary power transmitter side for wirelessly transmitting power to the secondary power receiver side via coupling plates having mutual capacitance $C_M$ and respective primary and secondary adaptive matching networks, the method comprising:

a) upon initiating a tuning of the primary and secondary adaptive matching networks, determining the switching frequency $f_{sw}$, and the bias-controlled variable primary and secondary inductors according to a default set of pre-loaded values;
b) tuning the switching frequency $f_{sw}$ of the power driver of the first control loop;
c) detecting a phase difference between input signals $V_P$ and $V_{CP}$ and maintaining a 90° phase angle between $V_P$ and $V_{CP}$ at all times;
d) whenever the detected phase difference between said $V_P$ and $V_{CP}$ signals is not 90°, generating an error signal to create a new switching frequency $f_{sw}$, until said switching frequency $f_{sw}$ equals the resonant frequency of said primary resonant circuit;
e) detecting a phase difference between input signals $V_S$ and $V_{CS}$ and maintaining said phase difference at 90°;
f) adjusting the secondary power receiver side's inductance value $L_S$ to tune the secondary adaptive matching network, according to the switching frequency $f_{sw}$ of the primary power transmitter side;
g) providing a correction signal to adjust the inductance value Ls, until the secondary adaptive matching network is at resonance (until $f_{sw}=f_0$) and the phase difference between the signals $V_S$ and $V_{CS}$ equals 90°;
h) sensing a regulated current $I_{reg}$ from the primary resonant circuit and comparing said regulated current to a target/reference current; and
i) generating a correction signal that adjusts an inductance $L_P$ through a bias winding until a desired regulated current $I_{reg}$ is achieved.

* * * * *